US008848229B2

(12) United States Patent
Kawakami

(10) Patent No.: US 8,848,229 B2
(45) Date of Patent: Sep. 30, 2014

(54) INFORMATION PROCESSING DEVICE, INFORMATION PROCESSING SYSTEM, CONTROL METHOD, AND STORAGE MEDIUM

(71) Applicant: Canon Kabushiki Kaisha, Tokyo (JP)

(72) Inventor: Shuuhei Kawakami, Higashiyamato-shi (JP)

(73) Assignee: Canon Kabushiki Kaisha, Tokyo (JP)

( * ) Notice: Subject to any disclaimer, the term of this patent is extended or adjusted under 35 U.S.C. 154(b) by 22 days.

(21) Appl. No.: 13/784,878

(22) Filed: Mar. 5, 2013

(65) Prior Publication Data

US 2013/0242342 A1 Sep. 19, 2013

(30) Foreign Application Priority Data

Mar. 13, 2012 (JP) ................................. 2012-055858

(51) Int. Cl.
*G06F 3/12* (2006.01)
*G06Q 30/04* (2012.01)

(52) U.S. Cl.
CPC .............. *G06F 3/1218* (2013.01); *G06Q 30/04* (2013.01)
USPC ........................................... 358/1.15; 358/1.9

(58) Field of Classification Search
USPC .................. 358/1.15, 1.6, 1.9, 444, 443, 1.16
See application file for complete search history.

(56) References Cited

U.S. PATENT DOCUMENTS

| | | | | |
|---|---|---|---|---|
| 8,306,877 | B2 * | 11/2012 | Iburg et al. | 705/28 |
| 2008/0096486 | A1 * | 4/2008 | Whitten | 455/66.1 |
| 2008/0273224 | A1 * | 11/2008 | Maulsby et al. | 358/1.15 |
| 2009/0036137 | A1 * | 2/2009 | El-Sayed et al. | 455/446 |
| 2011/0137776 | A1 * | 6/2011 | Goad et al. | 705/34 |
| 2011/0191212 | A1 * | 8/2011 | Iburg et al. | 705/28 |
| 2012/0317001 | A1 * | 12/2012 | Debusk et al. | 705/29 |

FOREIGN PATENT DOCUMENTS

| | | | |
|---|---|---|---|
| JP | 11-120231 | A | 4/1999 |
| JP | 2002-245359 | A | 8/2002 |

* cited by examiner

*Primary Examiner* — Jerome Grant, II
(74) *Attorney, Agent, or Firm* — Carter, DeLuca, Farrell & Schmidt, LLP

(57) ABSTRACT

A cooperation server executes printing processing of a document from an MFP through a printing server based on matter information including a printing instruction for the document received from a matter management server. The cooperation server notifies the client PC of the printing order that includes the printing ID and access information used for registering the costs related to the printing after completion of printing, provides a registering screen for costs related to printing by reason of the access from the client PC, and registers the costs registering information received from the client PC on the matter management server.

10 Claims, 23 Drawing Sheets

| Matter management server user ID | Matter management server user name | Matter management server password | Email address |
|---|---|---|---|
| MU0001 | Responsible party XX | pass1 | userxx@aaa.bbb |
| MU0002 | Responsible party YY | pass2 | useryy@aaa.bbb |
| MU0003 | Responsible party ZZ | pass3 | userzz@aaa.bbb |
| : | : | : | : |

| Matter ID | Matter name | Responsible party user ID |
|---|---|---|
| M0001 | MATTER A | U0001 |
| M0002 | MATTER B | U0002 |
| M0003 | MATTER C | U0003 |
| : | : | : |

| Matter ID | Costs ID | Costs name | Costs value | Unit |
|---|---|---|---|---|
| M0001 | C0001 | AA matter register printing | 1,000 | yen |
| M0001 | C0002 | BB decision document printing | 500 | yen |
| M0001 | C0003 | Transportation costs | 200 | yen |
| M0001 | C0004 | Travelling costs | 3 | km |
| M0002 | C0005 | CC evidence materials printing | 10,000 | yen |
| : | : | : | : | : |

| Matter ID | Document ID | Document name | Document file |
|---|---|---|---|
| M0001 | D0001 | AA matter register | AA_Jiken.doc |
| M0001 | D0002 | BB decision document | BB_Hanketu.doc |
| M0002 | D0003 | CC evidence materials | CC_Syouko.pdf |
| : | : | : | : |

| Cooperation server user ID (641) | Cooperation server password (642) | Matter management server user ID (643) | Matter management server password (644) | Printing server user ID (645) | Printing server password (646) |
|---|---|---|---|---|---|
| RU0001 | pass_r1 | MU0001 | pass1 | PU0001 | pass_p1 |
| RU0002 | pass_r2 | MU0002 | pass2 | PU0002 | pass_p2 |
| RU0003 | pass_r3 | MU0003 | pass3 | PU0003 | pass_p3 |
| : | : | : | : | : | : |

| Matter ID (651) | Matter name (652) | Matter management server user ID (653) | Printing ID (654) | Monetary amount (655) | Document name (656) | Document file (657) | Printing file (658) |
|---|---|---|---|---|---|---|---|
| M0001 | Matter A | MU0001 | P0001 | 1,000 | AA matter register | AA_Jiken.doc | AA_Jiken.pdl |
| M0001 | Matter A | MU0001 | P0002 | 500 | BB decision document | BB_Hanketu.doc | BB_Hanketu.pdl |
| M0002 | Matter B | MU0002 | P0003 | 10,000 | CC evidence materials | CC_Syouko.pdf | CC_Syouko.pdl |
| : | : | : | : | : | : | : | : |

| Printing server user ID (661) | Printing server password (662) |
|---|---|
| PU0001 | pass_p1 |
| PU0002 | pass_p2 |
| PU0003 | pass_p3 |
| : | : |

| Printing ID (671) | Monetary amount (672) | Printing file (673) |
|---|---|---|
| P0001 | 1,000 | AA_Jiken.pdl |
| P0002 | 500 | BB_Hanketu.pdl |
| P0003 | 10,000 | CC_Syouko.pdl |
| : | : | : |

| Color (681) | Size (682) | Monetary amount (683) |
|---|---|---|
| Monochrome | A4 | 10 |
| Monochrome | A3 | 30 |
| Color | A4 | 30 |
| Color | A3 | 50 |
| : | : | : |

| Location name (691) | Latitude (692) | Longitude (693) |
|---|---|---|
| LL law office | 35.579062 | 139.650695 |
| : | : | : |

| | Matter name | Costs name | Costs value | Unit | |
|---|---|---|---|---|---|
| | Matter A | AA matter register printing | 1,000 | yen | |
| | Matter A | BB decision document | 500 | yen | |
| | Matter A | Transportation costs | 200 | yen | |
| | Matter A | Travelling costs | 1,000 | km | |
| | Matter B | CC evidence materials | 10,000 | yen | |

INFORMATION PROCESSING DEVICE, INFORMATION PROCESSING SYSTEM, CONTROL METHOD, AND STORAGE MEDIUM

BACKGROUND OF THE INVENTION

1. Field of the Invention

The present invention relates to an information processing device, an information processing system, a control method, and a storage medium.

2. Description of the Related Art

A system has been proposed for charging a user costs that incurred during operations performed for a client when a provider performs an operation such as management of a matter for a client. For example, when a law office provides legal services in response to a request from a client, the law office often invoices based on a unit in relation to the request from the client (hereinafter such a job is referred to as a "matter"). This type of system summates the charged costs by adding the costs generated by the operations to a server that manages the matter (hereinafter referred to as the matter management server or matter management device), and therefore charges the costs at the completion of the matter. This type of matter management server includes a function of managing legal materials or the like related to the matter as document data. Japanese Patent Application Laid-Open No. 11-120231 discloses a matter management system that manages a matter, and when a matter that is open to public inspection on a notice board reaches a notice limit expiration, operational personnel are extracted to thereby divide the matter by taking into account processing experience values for similar matters and the progress of the predetermined matter by the operational personnel.

On the other hand, there is a printing service system in which an MFP is configured to print document data located in a printing server, when document data is sent by a user from a personal computer (PC) or the like through a network to a printing server, and a printing instruction is given by a user to the MFP that is installed on printing service retail premises. MFP is an abbreviation for a multifunction peripheral. Japanese Patent Application Laid-Open No. 2002-245359 discloses a printing service system in which a user gives a printing instruction from a terminal through a network to a printing device and a retail establishment charges the user a fee based on a barcode, indicating the printing monetary amount, that is output when the printing device executes printing.

For example, it may be assumed that a provider such as a law office uses a printing service system or a matter management system in relation to services provided by the law office in response to a request from a client. For example, the printing service system receives printing instructions for a document related to various maters performed by a law office on behalf of a client and performs printing of a document related to the matter that is managed by the matter management system. However, when the printing service system disclosed in Japanese Patent Application Laid-Open No. 2002-245359 is applied, if document data stored in a matter management server are printed, the provider (user) must once download the document data from the matter management server to a PC or the like that is operated by the user. Therefore, time and trouble are incurred by the user since the user must send the document data that has been downloaded from the PC or the like to the printing service system.

Printing costs are incurred when a user prints document data using an MFP provided with a printing service system.

Generally, printing costs are output from the MFP in the form of a receipt or the like. As a result, when the user registers the printing costs in the matter management server, it is necessary for the user to return to the law firm and refer to the receipt so as to manually make a record the printing costs from the PC to the matter management server. Furthermore, these processes cause time and trouble to the user since the user must use a manual operation in the matter management server for registering personnel costs incurred in relation to operations of the operational personnel who has fetched printed materials from the MFP as a cost related to printing.

SUMMARY OF THE INVENTION

The information processing device of the present invention causes an image forming device to print printing data to a user device from a matter management device without downloading a, and enables registration from the user device to the matter management device of costs related to the printing by use of a simple operation from the user device.

According to an aspect of the present invention an information processing device that enables communication between a matter management device that manages data for each matter upon receipt of an order from a user device, an image forming device, and a printing service device. The information processing device includes an acquiring unit configured to acquire document data and matter information linked to the document data that are sent from the matter management device that has received a printing instruction through the user device, to send the document data or the printing data that is generated based on the document data to the printing service device, and to acquire printing identifying information, that identifies the sent data, from the printing service device; a notifying unit configured to notify the user device of a printing notification including the acquired printing identification information and access information to register the printing costs related to the printing instruction after completion of printing an image providing unit configured to provide the user device with a costs registering screen that is used to register the printing costs related to the printing instruction due to the access based on the access information from the user device; and a registering unit configured to receive the costs registering information from the user device that performs registering processing on the costs registering screen and to register the costs corresponding to the costs registering information by linkage with the matter information on the matter management device.

Further features of the present invention will become apparent from the following description of exemplary embodiments with reference to the attached drawings.

BRIEF DESCRIPTION OF THE DRAWINGS

FIG. 6A to FIG. 6D illustrate an example of management information for use in the matter management system.

FIG. 7A to FIG. 7F illustrate an example of management information for use in the matter management system.

BRIEF DESCRIPTION OF THE EMBODIMENTS

First Embodiment (System Configuration)

Figure 1:
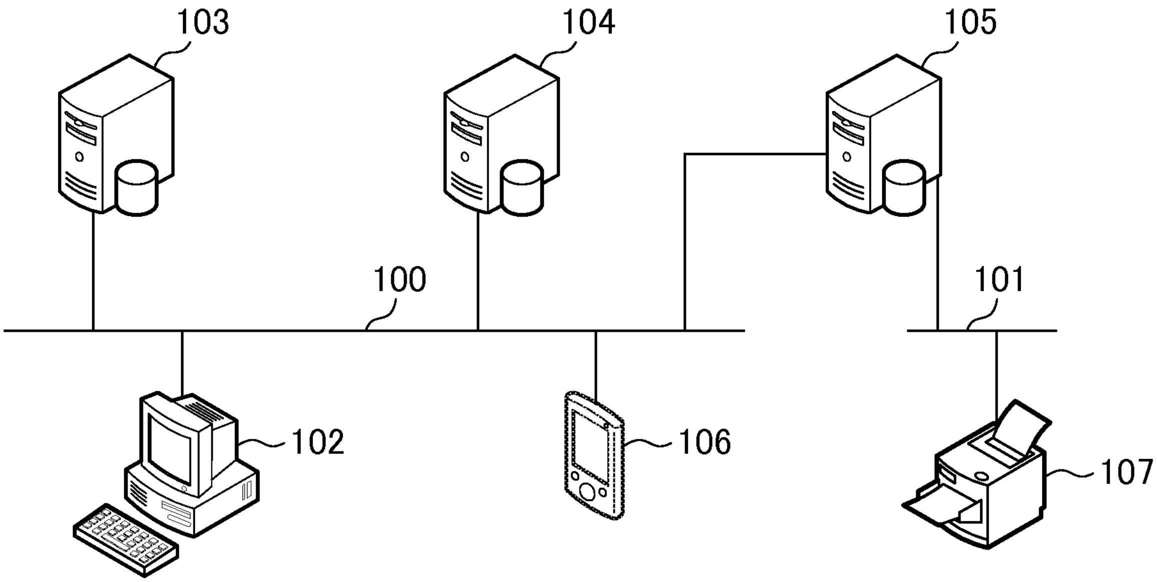
FIG. 1 illustrates a configuration example of a matter management system according to a first embodiment of the present invention.

FIG. 1 illustrates a configuration example of a matter management system according to this embodiment. The matter management system includes a client PC 102, a matter management server 103, a cooperation server 104, a printing server 105, a mobile terminal 106, and a multifunctional digital device (hereinafter referred to as "MFP") 107 that is an example of an image processing device. The matter management system is an information processing system that links the information processing operations of the respective devices. The matter management server 103 functions as a matter management device, and for example, has a function of managing the costs information for each matter in response to a request that is handled by operations in the law office. In the present embodiment, the matter management server 103 also manages costs in relation to copying, printing or transmission of faxes.

The respective devices shown in FIG. 1 are connected to communicate with each other through a network 101, or a network 100 such as an Ethernet (registered trademark). The matter management server 103, the cooperation server 104, the printing server 105 may be disposed on the Internet. Furthermore, the client PC 102 may be disposed in a local area network. The mobile terminal 106 may be connected to a network 100 such as a wireless LAN or a public wireless telephone network (not illustrated). The printing server 105 that functions as a printing service device is connected to the MFP 107 through the network 101, and configures the printing service system. FIG. 1 illustrates the network 101 as a network that is separate to the network 100, but the network 101 may be interconnected with the network 100 to thereby configure a single network.

The client PC 102 is a user device operated by a user. A web browser is installed on the client PC 102 and in the present embodiment, enables registering of printing instructions for a document related to a matter by access to the matter management server 103 and registering of costs information. Various types of applications may also be installed on the client PC 102. A web browser is installed on the mobile terminal 106, and in addition to registering costs information by accessing the cooperation server 104, the mobile terminal 106 enables notification of completion of printing, printing costs of a document and costs other than printing costs to the cooperation server 104. Costs other than printing costs for example are labor costs for example including personnel costs and transportation costs. Various types of applications may also be installed on the mobile terminal 106. Needless to say, the mobile terminal 106 may perform a printing instruction in relation to a document, and the client PC 102 may notify printing completion information, document printing costs, and labor costs such as personnel costs and transportation costs.

The cooperation server 104 is an information processing device that has the function of cooperating the matter management server 103 with the printing server 105. For example, the cooperation server 104 has the function of requesting printing by sending a document file that is managed by the matter management server 103 to the printing server 105. Furthermore, the cooperation server 104 has the function of registering costs information that is input by a user using the mobile terminal 106, or costs information for printing costs that are managed by the printing server 105, in the matter management server 103. In the present embodiment, the printing service system is configured by cooperating the printing server 105 with the MFP 107.

The printing server 105 has the function of receiving an order for printing of document data or printing data as a document file from the cooperation server 104 or the like, sending the printing data in response to a request from the MFP, and causing the MFP to print. The printing server 105 has the function of managing printing costs information produced when printing data is printed on the MFP 107. The MFP 107 is a device that includes a printing function, and may further include a function such as a copying function, a scanning function, a fax function, or the like. However, the system according to the present embodiment is not limited to the number of such constituent devices, and for example, the matter management server may be configured by separate servers for cost management and document management. Furthermore, the matter management server and the cooperation server may be configured as one server, and the cooperation server and the printing server may be configured as one server. The mobile terminal 106 may be configured as the same user device with the client PC 102.

(Hardware Configuration)

The hardware configuration of each device that configures the matter management system according to the present embodiment will be described making reference to FIG. 2, FIG. 3 and FIG. 4.

(Hardware Configuration of Client PC 102, Matter Management Server 103, Cooperation Server 104, and Printing Server 105)

Figure 2:
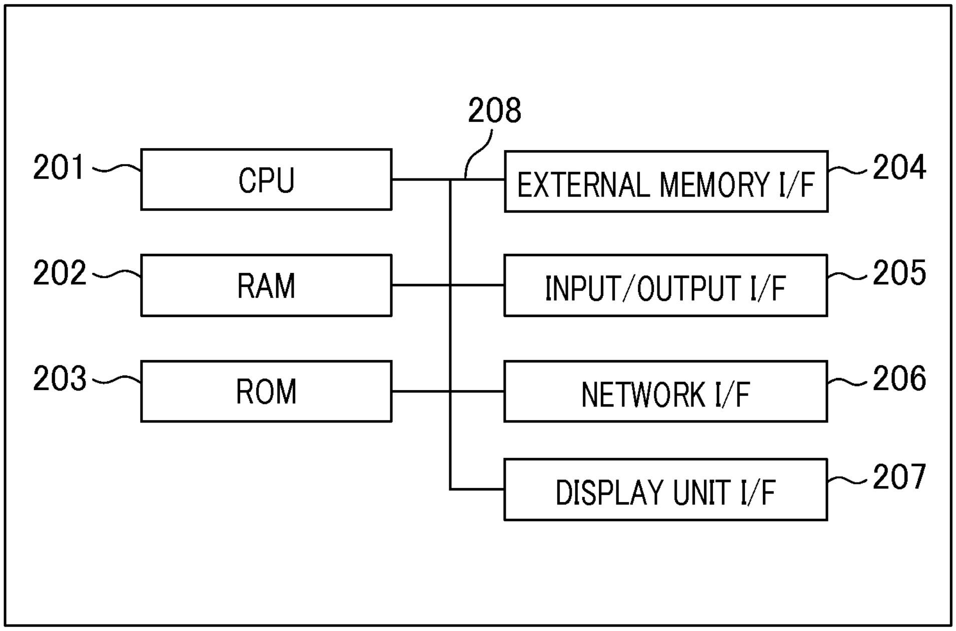
FIG. 2 illustrates a hardware configuration example of a client PC.

FIG. 2 is a block diagram illustrating the hardware configuration of the client PC 102, the matter management server 103, the cooperation server 104 and the printing server 105 as illustrated in FIG. 1. The client PC 102, the matter management server 103, the cooperation server 104 and the printing server 105 have the same hardware configuration, and herein, the hardware configuration of the client PC 102 will be described as an example. The client PC 102 includes a central processing unit (CPU) 201, a random access memory (RAM) 202, and a read only memory (ROM) 203. The client PC 102 includes an external memory I/F 204, an input/output I/F 205, a network I/F 206, and a display unit I/F 207. The respective processing units are connected to enable mutual communication through a system bus 208.

Control programs such as an operating system or an application or the like are stored in the external memory that is connected to the ROM 203 or the external memory I/F 204. The CPU 201 reads out and executes the control programs as necessary from the ROM 203 or the external memory that is connected to the external memory I/F 204 onto the RAM 202 to thereby exhibit the function of a computer. The CPU 201 communicates with other devices that are on the network connected through the network I/F 206, for example, the matter management server 103 or the cooperation server 104 as illustrated in FIG. 1. The external memory I/F 204 receives input and output from a HDD, IC card or the like that is connected to the external memory I/F 204. A keyboard, a mouse or the like is connected to the input/output I/F 205, and the input/output I/F 205 receives the input from the user that uses the client PC 102. The display unit I/F 207 is connected to a display or the like and displays an input screen or the like to a user that uses the client PC 102.

(Hardware Configuration of Mobile Terminal 106)

Figure 3:
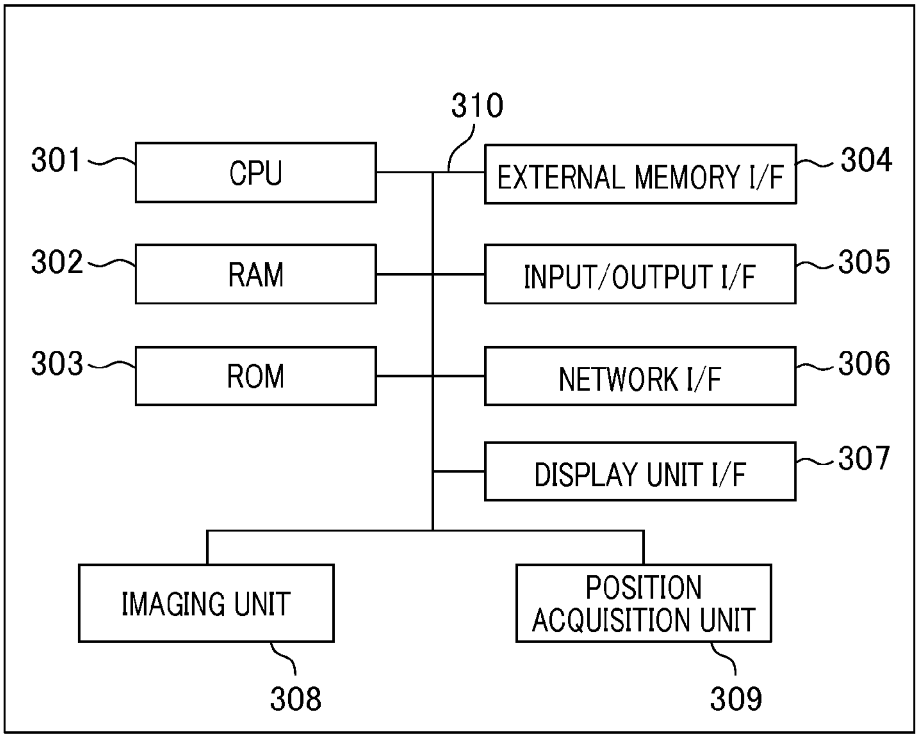
FIG. 3 illustrates a hardware configuration example of a mobile terminal.

FIG. 3 is a block diagram illustrating the hardware configuration of the mobile terminal 106 illustrated in FIG. 1. The mobile terminal 106 includes a CPU 301, a RAM 302, a ROM 303, an external memory I/F 304, an input/output I/F 305, a network I/F 306, and a display unit I/F 307. Each mobile terminal 106 further includes an imaging unit 308 and a position acquisition unit 309. Each processing unit is connected each other to enable mutual communication through a system bus 310.

Control programs such as an operating system or an application or the like are stored in the ROM 303 or the external memory that is connected to the external memory I/F 304. The CPU 301 reads out and executes the control programs as necessary from the ROM 303 or the external memory that is connected to the external memory I/F 304 onto the RAM 302 to thereby exhibit the function of a mobile terminal. The CPU 301 communicates with other devices that are on the network connected through the network I/F 306 or on a public line. The external memory I/F 304 receives input and output from a flash memory or the like that connected to the external memory I/F 304. A pointing device or various types of hardware keys or the like are connected to the input/output I/F 305, and receives the input from the user that uses the mobile terminal 106. The display unit I/F 307 is connected to a display or the like and displays an input screen or the like to a user that uses the mobile terminal 106.

The imaging unit 308 performs photographic imaging and acquires the imaging result as an image file. The specific operation of the present embodiment is that the imaging unit reads an image as a receipt on which the printing costs information of a printed document that is outputted by the MFP 107 is described. The position acquisition unit 309 that functions as a position information acquisition unit acquires position information such as the current longitude or latitude of the mobile terminal 106 by use of a global positioning system (GPS) or the like.

(Hardware Configuration of MFP 107)

Figure 4:
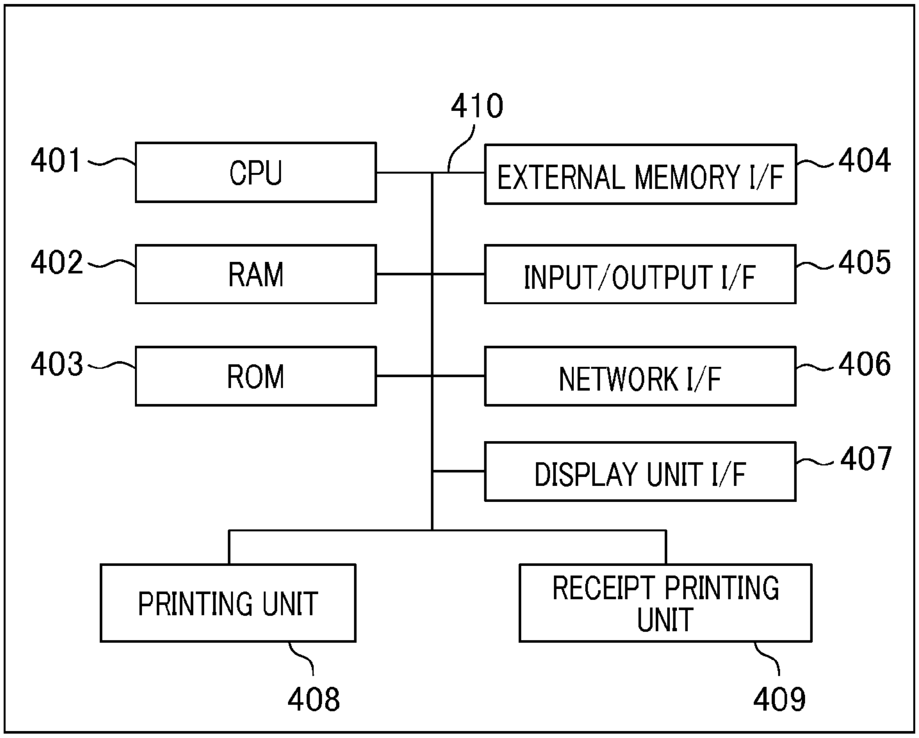
FIG. 4 illustrates a hardware configuration example of an MFP.

FIG. 4 is a block diagram that illustrates a hardware configuration example of an MFP 107 as illustrated in FIG. 1. The MFP 107 includes a CPU 401, a RAM 402, a ROM 403, an external memory I/F 404, an input/output I/F 405, a network I/F 406, and a display unit I/F 407. Each MFP 107 further includes a printing unit 408 and a receipt printing unit 409. Each processing unit is connected each other to enable mutual communication through a system bus 410.

Control programs such as an operating system or an application or the like are stored in the ROM 403 or the external memory that is connected to the external memory I/F 404. The CPU 401 reads out and executes the control programs as necessary from the ROM 403 or the external memory that is connected to the external memory I/F 404 onto the RAM 402 to thereby exhibit the function of a MFP. The CPU 401 communicates with other devices that are on the network connected through the network I/F 406 or on a public line. The external memory I/F 404 receives input and output from a HDD, IC card, flash memory or the like that is connected to the external memory I/F 404. A pointing device or various types of hardware keys or the like are connected to the input/output I/F 405, and receives the input from the user that uses the MFP 107. The display unit I/F 407 is connected to a display or the like, and displays an input screen or the like to a user that uses the MFP 107. The printing unit 408 prints a document file or image file that is stored in the RAM 402, the ROM 403 or the external memory I/F 404 in accordance with the instructions from the CPU 401. The receipt printing unit 409 prints costs information that is stored in the RAM 402, the ROM 403 or the external memory I/F 404 in accordance with the instructions from the CPU 401.

(Software Configuration)

Figure 5:
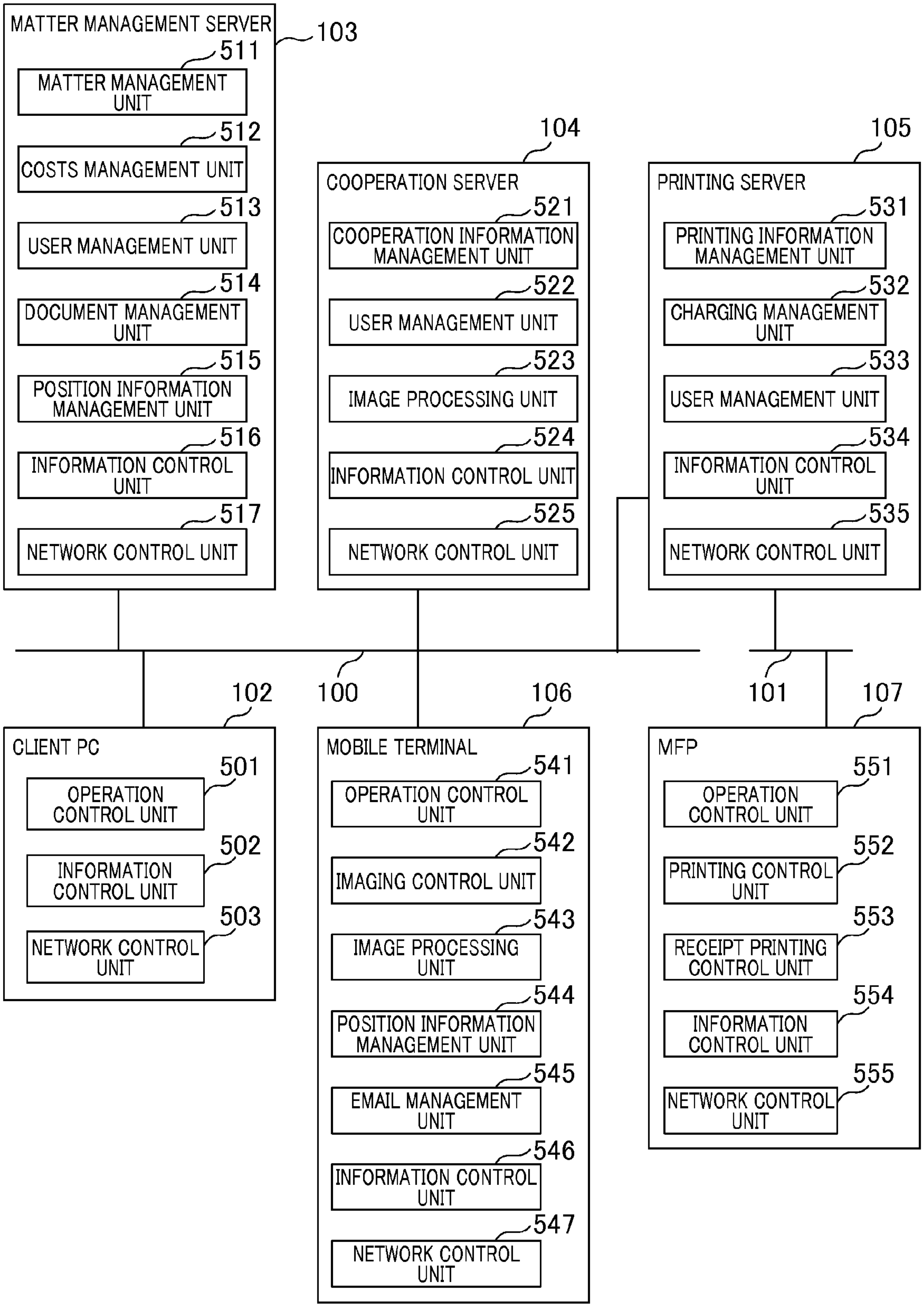
FIG. 5 illustrates an example of a functional block diagram of the respective devices used in the matter management system.

FIG. 5 is a software configuration diagram of the matter management system according to the present embodiment. The functions in the block diagram illustrated in FIG. 5 are realized by execution by the respective CPUs of software (programs) processed by the respective devices illustrated in FIG. 1. More specifically, the programs stored in the HDD of each device are loaded onto the RAM, and the loaded programs are executed by the respective CPUs so that the functions are realized.

(Client PC 102)

Figure 8:
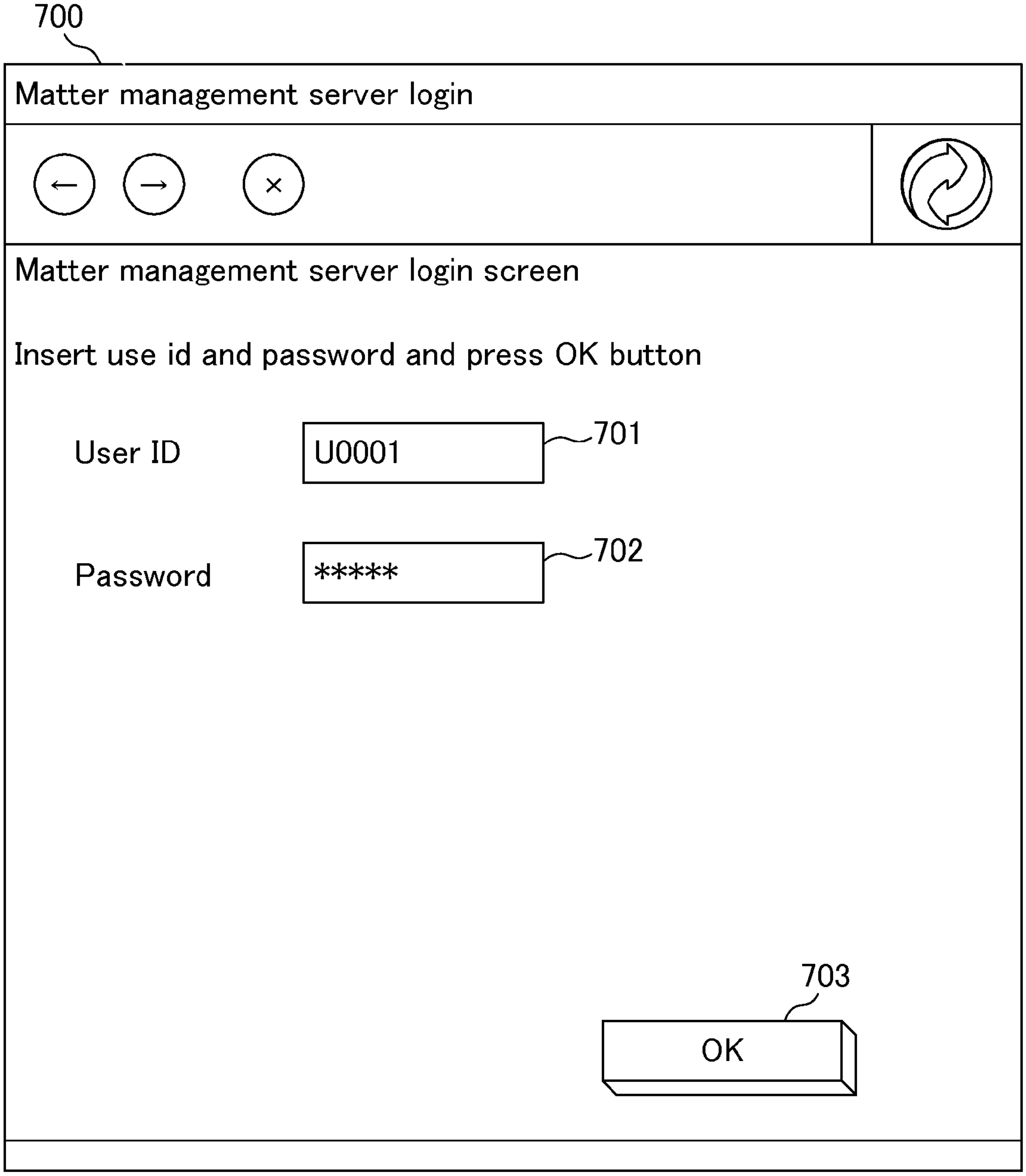
FIG. 8 illustrates an example of a matter management server login screen displayed on a display.
Figure 9:
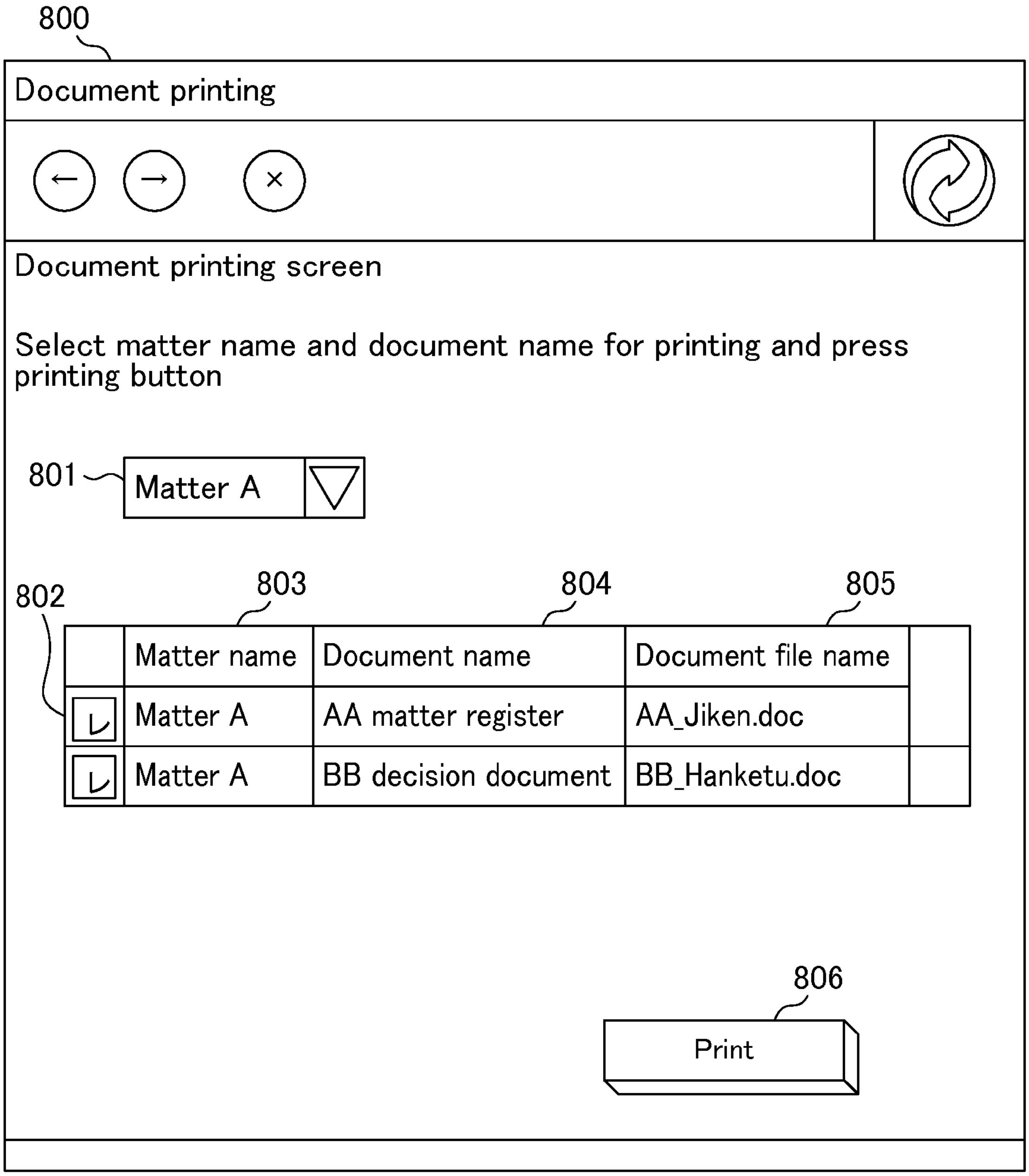
FIG. 9 illustrates an example of a document printing screen displayed on the display.
Figure 14:
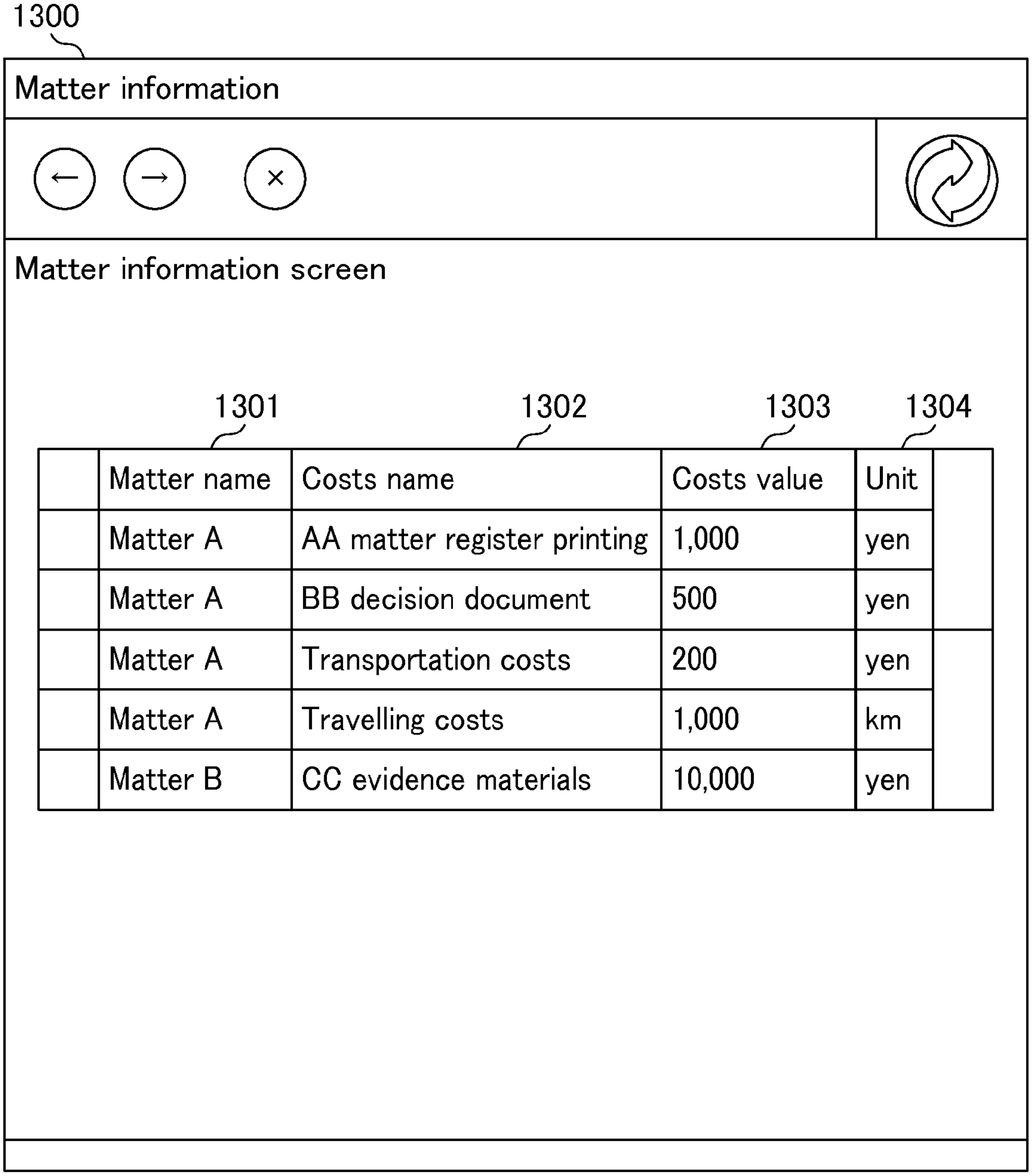
FIG. 14 illustrates an example of a matter information screen displayed on the display.

The client PC 102 includes an operation control unit 501, an information control unit 502, and a network control unit 503. The operation control unit 501 displays a screen as illustrated in FIG. 8, FIG. 9, or FIG. 14 or the like through the display unit I/F 207 on the display in accordance with the instructions from the information control unit 502. The operation control unit 501 detects the detail input by the keyboard or the mouse by a user through the input/output I/F 205, and sends the detail input to the information control unit 502.

The information control unit 502 instructs the network control unit 503 and requests a matter management server login screen 700 as illustrated in FIG. 8 from the matter management server 103. The information control unit 502 receives the matter management server login screen 700 from the network control unit 503 and then orders the operation control unit 501 to display the matter management server login screen 700 illustrated in FIG. 8 through the display unit I/F 207 on the display. The information control unit 502 receives the details input by a keyboard or a mouse from the operation control unit 501 through the input/output I/F 205. The information control unit 502 receives information, that is input by a user on the matter management server login screen 700, through the operation control unit 501, and sends the received information through the network control unit 503 to the matter management server 103.

The information control unit 502 instructs the network control unit 503 and requests a document printing screen 800 as illustrated in FIG. 9 to the matter management server 103. The information control unit 502 receives the document printing screen 800 from the matter management server 103 and then causes the operation control unit 501 to display the document printing screen 800 illustrated in FIG. 9 by. The screen 800 is displayed through the display unit I/F 207 on the display. The information control unit 502 receives the details input by a keyboard or a mouse from the operation control unit 501 through the input/output I/F 205. The information control unit 502 receives information, that is input by a user on the document printing screen 800, through the operation control unit 501, and sends the received information through the network control unit 503 to the matter management server 103. Furthermore, the information control unit 502 instructs the network control unit 503 to request a matter information screen 1300 as illustrated in FIG. 14 to the matter management server 103. The information control unit 502 receives the matter information screen 1300 from the network control unit 503 and then causes the operation control unit 501 to display the matter information screen 1300 illustrated in FIG. 14 on the display through the display unit I/F 207.

The network control unit 503 receives from the network I/F 206 the various types of information sent from the matter management server 103 through the network 100 and passes it to the information control unit 502. The network control unit 503 sends the various types of information received from the information control unit 502 through the network I/F 206 and the network 100 to the matter management server 103.

(Matter Management Server 103)

The matter management server 103 includes a matter management unit 511, a costs management unit 512, a user management unit 513, a document management unit 514, a position information management unit 515, an information control unit 516, and a network control unit 517. The matter management server 103 is a server that manages the data for each matter unit or matter. The matter management unit 511 stores the matter information 610 illustrated in FIG. 6B in the external memory, or reads out from the external memory. The costs management unit 512 stores the costs information 620 illustrated in FIG. 6C in the external memory, or reads out from the external memory. The user management unit 513 stores the user information 6020 of a user that uses the matter management server illustrated in FIG. 6A in the external memory, or reads out from the external memory. The document management unit 514 stores the document information 630 illustrated in FIG. 6D in the external memory, or reads out from the external memory. The document management unit 514 stores the actual document file, that is shown as the document file 634 of the document information 630, in the external memory, or reads out from the external memory. The position information management unit 515 stores the position information 690 illustrated in FIG. 7F in the external memory, or reads out from the external memory. The processing above is executed by the respective processing units in response to an order from the information control unit 516, and is stored in the external memory through the RAM 202 or the external memory I/F 204, or is read out from the external memory.

The information unit 516 returns each screen corresponding to the received acquisition request below received from the client PC 102 through network control unit 517. The information control unit 516 sends the matter management server login screen 700 to the client PC 102 in response to an acquisition request for a matter management server login screen 700 as illustrated in FIG. 8. The information control unit 516 verifies that the user information received from the client PC 102 through the network control unit 517 coincides with the user information 600 that is managed by the user management unit 513. The information control unit 516 sends the verification result for the user information through the network control unit 517 to the client PC 102.

The information control unit 516 sends the document printing screen 800 illustrated in FIG. 9 to the client PC 102 in response to an acquisition request for a document printing screen. The information control unit 516 receives a document ID 632 illustrating document identification information and a matter ID 611 illustrating matter identification information from the client PC 102. The information control unit 516 orders the user management unit 513 to read the user information 600 of the user that is currently logged-in to thereby acquire the matter management server user information 600. The information control unit 516 orders the matter management unit 511 to read the matter information 610 of the received matter ID 611 and acquires the matter information 610.

The information control unit 516 orders the document management unit 514 to read the document information 630 including the document file based on the matter ID 611 and the document ID 631 received from the client PC 102, and receives the document information 630. The information control unit 516 sends the matter management server information 600, the matter information 610, the document information 630 and the document files through the network control unit 517 to the cooperation server 104 to thereby order document printing. That is to say, the information control unit 516 has the function of a sending unit that receives printing instructions for a document related to a matter from the client PC 102, and sends the matter information associated with the printing instruction, document file, and document data to the cooperation server 104.

The information control unit 516 also has the function of a receiving unit that receives costs information 620 from the cooperation server 104 through the network control unit 517, and sends the received costs information 620 to the costs management unit 512 for storage of the costs information 620. After the costs management unit 512 stores the costs information 620, the information control unit 516 notifies the cooperation server 104 of the completion of the storage of costs information. The information control unit 516 sends the matter information screen 1300 illustrated in FIG. 14 in response to an acquisition request for matter information screen from the client PC 102. More specifically, the information control unit 516 orders the matter management unit 511 to read the matter information 610 and the costs management unit 512 to read the costs information 620. The information control unit 516 receives the matter information 610 and the costs information 620, generates a matter information screen 1300 based on the information, and sends the screen 1300 to the client PC 102.

Through the network I/F 206, the network control unit 517 receives various types of information sent from client PC 102, the cooperation server 104 and the mobile terminal 106 through the network 100, and sends the received information to the information control unit 516. The network control unit 517 sends various types of information received from the information control unit 516 through the network I/F 206 and the network 100 to the client PC 102, the cooperation server 104 and the mobile terminal 106.

(Cooperation Server 104)

The cooperation server 104 includes the cooperation information cooperation information management unit 521, the user management unit 522, the image processing unit 523, the information control unit 524, and the network control unit 525. In response to an order from the information control unit 524, the cooperation information cooperation information management unit 521 stores the cooperation information 650 illustrated in FIG. 7B in the RAM 202 or in the external memory through the external memory I/F 204, or reads out such information from the external memory. In response to an order from the information control unit 524, the user management unit 522 stores the cooperation server user information 640 illustrated in FIG. 7A in the RAM 202 or through the external memory I/F 204 in the external memory, or reads out such information from the external memory.

The image processing unit 523 expands the document file received from the information control unit 524 on the RAM 202 or the external memory I/F 204, and executes conversion processing into a page description language (PDL) to thereby generate a document PDL file. The image processing unit 523 sends the document PDL file that results from the processing operation as printing data to the information control unit 524. That is to say, the image processing unit 523 has the function of a generating unit that generates printing data to be printed as a document by the image forming device 107. The image processing unit 523 expands the document file received from the information control unit 524 on the RAM 202 or the external memory I/F 204 and executes optical character recognition (OCR) processing to thereby acquire character information. The image processing unit 523 sends the character information that results from the processing operation to the information control unit 524.

The information control unit 524 receives the matter management server user information 600, the matter information 610 and the document information 630 through the network control unit 525 from the matter management server 103. The information control unit 524 sends the received document files one by one to the image processing unit 523 and receives the PDL files that are converted by the image processing unit 523. The information control unit 524 orders the user management unit 522 to read the printing server user ID 645 and the printing server password 646 stored in the user management unit 522, and receives the them from the user management unit 522. The information control unit 524 sends the document PDL files, the printing server user ID 645 and the printing server password 646 as printing data to the printing server 105, and executes a printing order. The information control unit 524 receives the printing ID 671 corresponding to the document PDL file from the printing server 105. That is to say, the information control unit 524 functions as an acquisition unit that acquires document information that is sent from the matter management server 103 and matter information linked to the document information, and acquires printing identifying information, that identifies the data sent to the printing service device based on that information, from the printing service device.

The information control unit 524 sends the received printing ID 671, the matter information 610, and the document information 630 to the cooperation information management unit 521 for cooperation and storage as cooperation information 650. That is to say, the information control unit 524 and the cooperation information management unit 521 function as a management unit that manages the cooperation information 650 as management information. The information control unit 524 prepares a printing order notification email 900 illustrated in FIG. 10 that is configured from the matter information 610, the document information 630, the printing ID 671 and a uniform resource locator (URL) of the cooperation server 104 as access information. The information control unit 524 sends the prepared printing order notification email 900 through the network control unit 525 to the mobile terminal 106. That is to say, the information control unit 524 functions as a notification unit that notifies the mobile terminal 106 of printing notification that includes printing identification information and access information for registering the costs related to printing after completion of printing. The information control unit 524 sends the document printing order processing completion to the matter management server 103 through the network control unit 525. When the mobile terminal 106, that has received the printing order notification email 900, accesses a URL in response to a user operation, the information control unit 524 receives a request for a costs information registering screen from the mobile terminal 106. Since the URL includes the matter ID 651 and the printing ID 654, the information control unit 524 orders the cooperation information management unit 521 to read the cooperation information 650 based on the ID information.

The information control unit 524 orders the user management unit 522 to read the cooperation server user information 640 that is linked to the matter management server user ID 643 corresponding to the matter management server user ID 653 of the cooperation information that is linked to the matter ID 651. The information control unit 524 sends the printing ID 654, the printing server password 646 and the printing server user ID 645 of the cooperation server user information 640 received from the user management unit 522 one by one to the printing server 105, and requests a monetary amount 672 for the printing information 670. The monetary amount 672 is the printing costs information. When the information control unit 524 has acquired all the monetary amounts related to the printing ID 671 from the printing server 105, the cooperation information management unit 521 sets and manages the monetary amount 672 as the monetary amount 655 of the cooperation information 650.

Figure 13:
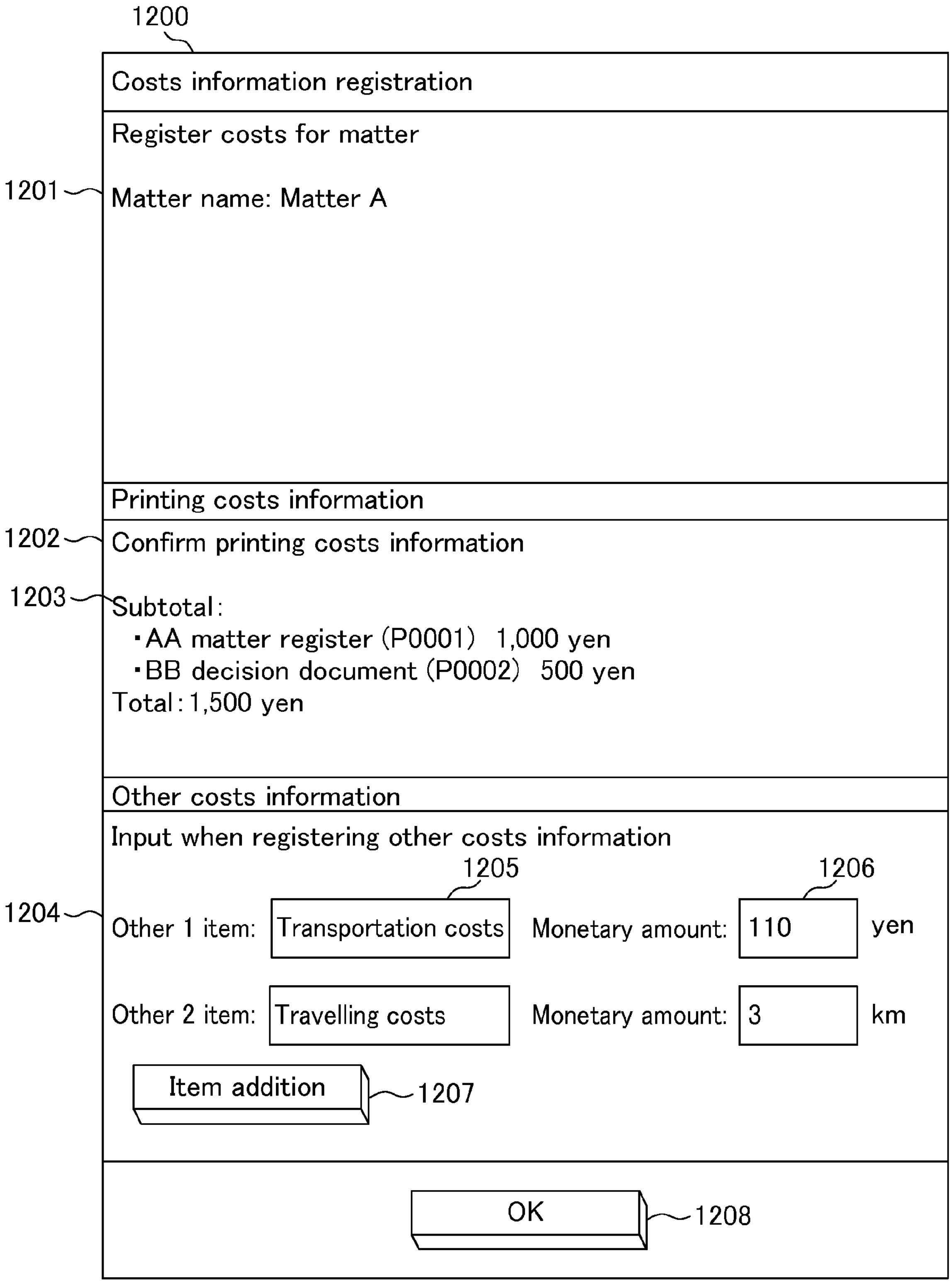
FIG. 13 illustrates an example of a costs information registering screen displayed on the display.

Next, the information control unit 524 generates the costs information registering screen 1200 illustrated in FIG. 13. More specifically, the information control unit 524 generates a costs registering screen including the monetary amount 655 and the document name 656 corresponding to the printing ID and the matter ID accessed by the mobile terminal 106 in relation to the cooperation information 650. The information control unit 524 sends the generated costs registering screen through the network control unit 525 to the mobile terminal 106. That is to say, the information control unit 524 has the function of an image providing unit that provides a costs registering screen that is used in registering of costs related to printing resulting from access to the URL, that is the access information. Furthermore, the information control unit 524 receives information other than information for printing costs from the mobile terminal 106, that is to say, other costs information. The information control unit 524 sends the matter ID 651, the printing monetary amount 655 and the other costs information of the cooperation information through the network control unit 525 to the matter management server 103 to order costs information registering. That is to say, the information control unit 524 has the function of a registering unit that receives costs registering information from the mobile terminal 106 that performs registering processing on a costs registering screen, and that registers the costs corresponding to the costs registering information on the matter management information device. The information control unit 524 notifies the costs information registering completion to the mobile terminal 106.

The network control unit 525 receives various types of information, that is sent from the mobile terminal 106, the printing server 105 and the matter management server 103 and received through the network 100, through the network I/F 206, and sends the received information to the information control unit 524. The network control unit 525 sends various types of information received from the information control unit 524 through the network I/F 206 and the network 100 to the matter management server 103, the printing server 105 and the mobile terminal 106.

(Printing Server 105)

The printing server 105 includes a printing information management unit 531, a charging management unit 532, a user management unit 533, an information control unit 534 and a network control unit 535. The printing information management unit 531 stores the document PDL file or the printing information illustrated in FIG. 7D in the external memory or reads from the external memory. The charging management unit 532 stores the charging information illustrated in FIG. 7E in the external memory or reads from the external memory. The user management unit 533 stores the printing server user information 660 illustrated in FIG. 7C in the external memory or reads from the external memory. The above processing steps enable storing of the document PDL file or various types of information through the RAM 202 or the external memory I/F 204, or reading from the external memory by execution by respective processing units in response to an order from the information control unit 534.

The information control unit 534 receives the document PDL files, the cooperation server password 642 and the cooperation server user ID 641 from the cooperation server 104 through the network control unit 535. The information control unit 534 sets the received cooperation server user ID 641 and the cooperation server password 642 as a printing server user ID 661 and a printing server password 662, and orders the user management unit 533 to store printing server user information 660. That is to say, the information control unit 534 has the function of a generating unit configured to generate printing identification information to identify matter information. Furthermore, the information control unit 534, as necessary, orders the user management unit 533 to read printing server user information 600, for example, upon verification processing or the like, and receives the printing server user information 600 from the user management unit 533. The information control unit 534 orders the printing information management unit 531 to store the received document PDL files, and receives the printing ID 671 of the printing information 670. The information control unit 534 sends the received printing ID 671 through the network control unit 535 to the cooperation server 104.

When receiving access, for example, upon acquisition of printing costs from the cooperation server 104, the information control unit 534 verifies whether a cooperation server user ID 641 and a cooperation server password 642 received from the cooperation server 104 are available in the received printing server user information 660. When the information control unit 534 receives the printing ID 671 through the network control unit 535 from the MFP 107, the information control unit 534 orders the document management unit 531 to read the document PDL file of the received printing ID 671, and receives the document PDL file. The information control unit 534 orders the charging management unit 532 to read the charging information 680 in FIG. 7E to thereby receive it. The information control unit 534 sends the received charging information 680 and the document PDL file to the MFP 107.

The information control unit 534 receives the monetary amount for the costs generated by printing of the document PDL file from the MFP 107 through the network control unit 535. The information control unit 534 sends the received monetary amount to the printing information management unit 531 and orders to link the received monetary amount with the printing ID 671 and store it as a monetary amount 672. When storage is completed, the information control unit 534 notifies monetary amount registering completion to the MFP 107 through the network control unit 535. The information control unit 534 receives a user ID and a password, a printing ID 671 and a printing information request from the cooperation server 104. The information control unit 534 orders the user management unit 533 to read the printing server user information 660 by using the received user ID as a printing server user ID 661, and acquires the read information. The information control unit 534 uses the printing server user information 660 to verify the user ID and the password received from the cooperation server 104. The information control unit 534 sends the printing ID 671 to the printing information management unit 531, and orders the printing information management unit 531 to read the printing information 670 corresponding to the printing ID 671 and receives the printing information 670. The information control unit 534 sends the printing information 670 to the cooperation server 104 through the network control unit 535.

Through the network I/F 206, the network control unit 535 receives various types of information sent from the cooperation server 104 or the MFP 107 through the network 100, and sends the received information to the information control unit 534. The network control unit 535 sends various types of information received from the information control unit 534 through the network I/F 206 and the network 100 to the cooperation server 104 or the MFP 107.

(Mobile Terminal 106)

Figure 10:
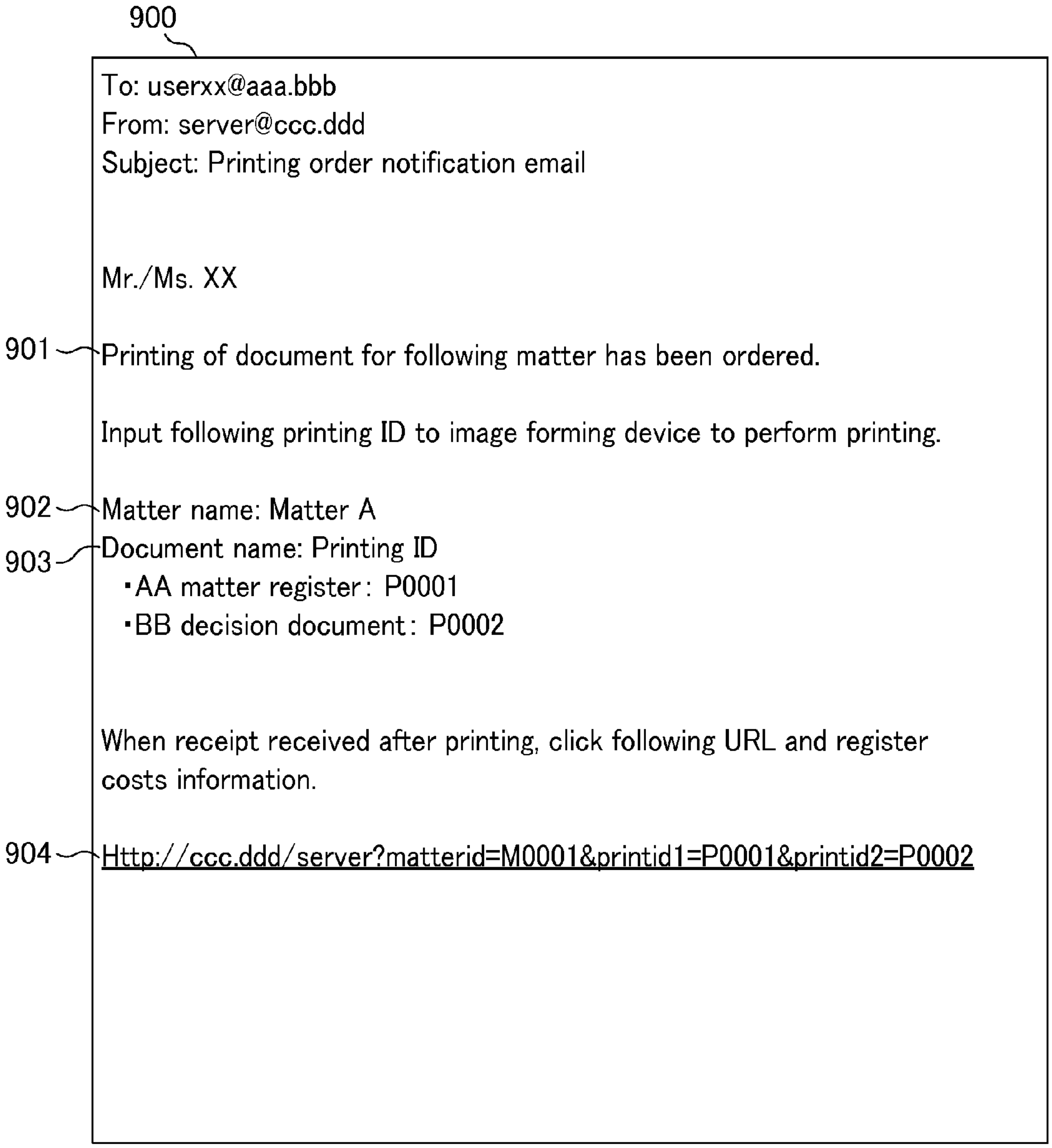
FIG. 10 illustrates an example of a screen of a document printing notification email sent from a cooperation server.

The mobile terminal 106 includes an operation control unit 541, an imaging control unit 542, an image processing unit 543, a position information processing unit 544, an email management unit 545, an information control unit 546, and a network control unit 547. For example, the operation control unit 541 displays a costs information registering screen as illustrated in FIG. 13 or an email text as illustrated in FIG. 10 through the display unit I/F 307 on the display in accordance with the instructions from the information control unit 546. The operation control unit 541 detects the details input to the pointing device or various types of hardware keys by a user through the input/output I/F 305 and sends the same to the information control unit 502. The imaging control unit 542 executes photographic imaging by use of an imaging unit 308 in accordance with instructions from the information control unit 546 and sends the image file that results from the imaging operation to the information control unit 546.

The image processing unit 543 expands the image file received from the information control unit 546 on the RAM 302 or the external memory I/F 304 and performs OCR processing to thereby acquire character information. The image processing unit 543 sends the character information that results from the processing operation to the information control unit 546. The position information management unit 544 acquires position information, for example position information 690, of the mobile terminal 106 by use of the position acquisition unit 309 in response to an order from the information control unit 546. The position information management unit 544 stores the position information 690 in the RAM 302 or in an external memory through the external memory I/F 304. The position information management unit 544 stores the position information 690 illustrated in FIG. 7F in the external memory or reads it from the external memory in response to an order from the information control unit 546. The email management unit 545 stores the email data such as the printing order notification email 900 illustrated in FIG. 10 in the external memory or reads it from the external memory in response to an order from the information control unit 546.

The information control unit 546 reads the printing order notification email 900 from the email management unit 545 and orders display of the printing order notification email 900 on the operation control unit 541. When the operation control unit 541 receives a signal that the cooperation server URL 904 has been selected through the pointing device by a user, the information control unit 546 orders the network control unit 547 to access the cooperation server 104 in accordance with the cooperation server URL 904. The cooperation server URL 904 includes a matter ID 651 and a printing ID 654. The access to the cooperation server 104 is a request for a costs information registering screen. The information control unit 546 receives the costs information registering screen 1200 illustrated in FIG. 13 from the cooperation server 104, and orders the operation control unit 541 to display the costs information registering screen 1200 on the display. When the information control unit 546 receives other costs information input to the costs information registering screen 1200 by a user from the operation control unit 541, the other costs information that has been received is sent to the cooperation server 104. The information control unit 546 receives costs information registering completion notification from the cooperation server 104.

Through the network I/F 306, the network control unit 547 receives various types of information sent from the cooperation server 104 that have been received through the network 100, and sends the received information to the information control unit 546. The network control unit 547 sends the various types of information received from the information control unit 546 through the network I/F 306 and the network 100 to the cooperation server 104.

(MFP 107)

The MFP 107 includes an operation control unit 551, a printing control unit 552, a receipt printing control unit 553, an information control unit 554, and a network control unit 555. The operation control unit 551 displays a printing execution screen as illustrated for example in FIG. 11 through the display unit I/F 407 on the display in accordance with the instructions from the information control unit 554. Furthermore, the operation control unit 551 detects the content that is input to various hardware keys or pointing devices by a user through the input/output I/F 405, and sends the same to the information control unit 554. The printing control unit 552 receives a document PDL that has been received from the printing server 105 through the information control unit 554, uses the printing unit 408 to print the document PDL file and sends the printing result to the information control unit 554. The receipt printing control unit 553 receives the printing information 670 from the information control unit 554, uses the receipt printing unit 409 to print a receipt that states the printing ID 671 or the monetary amount 672, and sends the printing result to the information control unit 554.

Figure 11:
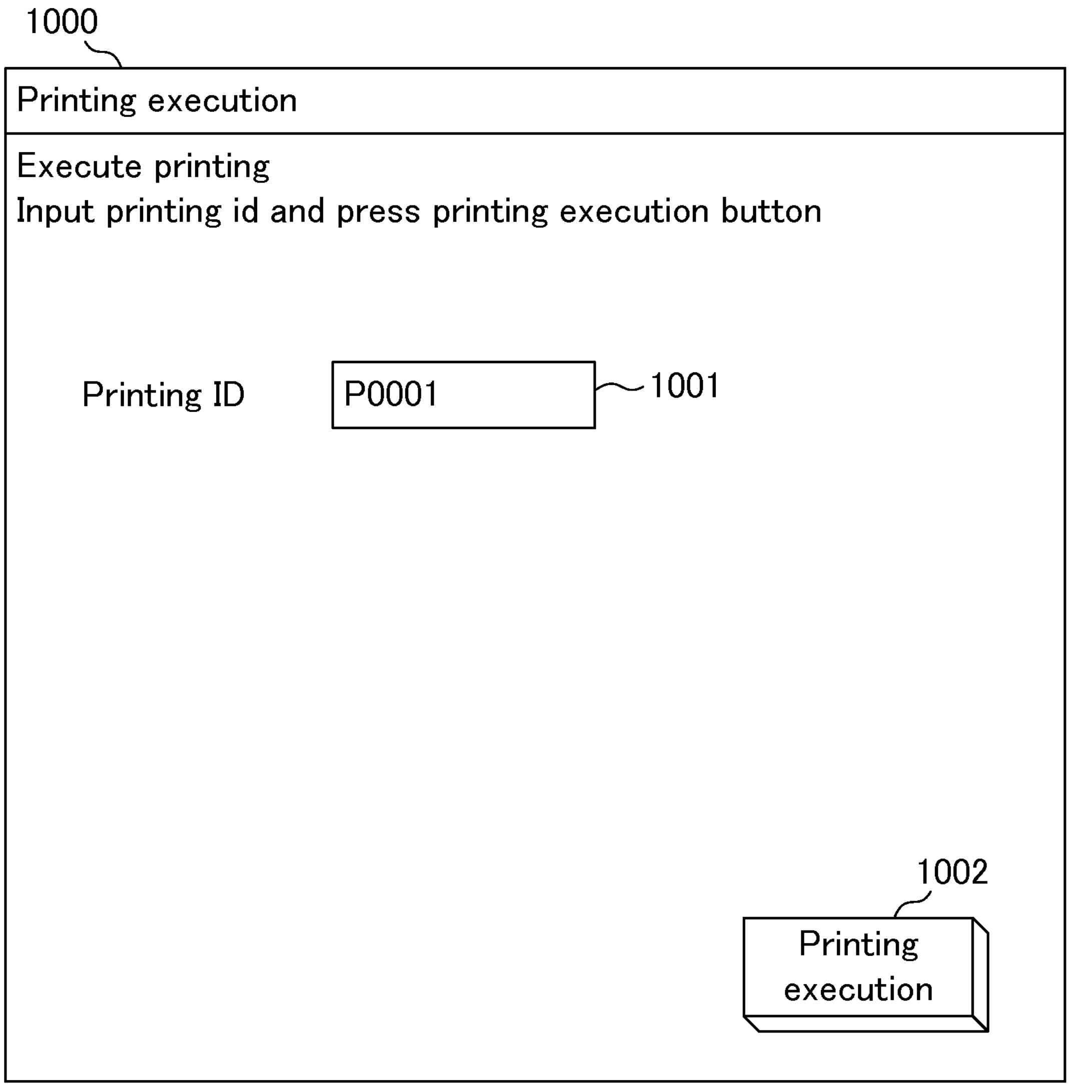
FIG. 11 illustrates an example of a printing execution screen displayed on the display.

The information control unit 554 orders the operation control unit 551 to display the printing execution screen 1000 illustrated in FIG. 11 on the display. The information control unit 554 receives a printing ID 671 that received from the operation control unit 551 and that input by a user on the printing execution screen 1000, and sends the received printing ID 671 through the network control unit 555 to the printing server 105. The information control unit 554 receives the document PDL file and the charging information 680 associated with the ID 671 from the printing server 105 and sends the received document PDL file to the printing control unit 552 to order printing of the document PDL file. Upon receipt of the printing result from the printing control unit 552 that has completed printing, the information control unit 554 calculates the monetary amount based on the charging information 680 and the printing result. The information control unit 554 sends the calculated monetary amount, that is to say, the printing costs to the printing server 105. The information control unit 554 receives a monetary amount registering completion notification from the printing server 105, sends the printing ID 671 and the monetary amount 672 to the receipt printing control unit 553 and instructs printing of the receipt. In the present embodiment, when printing is completed, the receipt printing control unit 553 prints the receipt. However, a setting may be provided in the mobile terminal 106, the printing server 105 or the MFP 107 to not print the receipt. It is possible to reduce unnecessary use of paper, toner or the like by printing a receipt only when the user requires the receipt.

Through the network I/F 406, the network control unit 555 receives various types of information sent from the printing server 105 that have been received through the network 100, and sends the received information to the information control unit 554. The network control unit 555 sends the various types of information received from the information control unit 554 through the network I/F 406 and the network 101 to the printing server 105.

(Information Configuration)

FIG. 6 and FIG. 7 illustrate the configuration of the information used in the matter management system according to the present embodiment. The various types of information illustrated in FIG. 6 and FIG. 7 are stored in the RAM or ROM of the various devices illustrated in FIG. 1, in an external memory or the like, and are processed by software as illustrated in FIG. 2.

(Matter Management Server User Information 600)

The matter management server user information 600 illustrates information of a user that uses the matter management server 103. The matter management server user information 600 includes a matter management server user ID 601 that is the ID allocated to the user that uses the matter management server 103, a matter management server user name 602 that is the user name, and a matter management server password 603 that is used in user authentication. The matter management server user information 600 includes an email address 604 that is the address for emails to the matter management server user. The email address 604 may be the address for sending an email to the client PC 102, or may be the address for sending the email to the mobile terminal 106. In addition to the information illustrated in FIG. 6A, the matter management server user information 600 may also include the address related to the matter management server user or the like, user related information such as a telephone number or the like, personal setting information for the matter management server, and access right setting information. The matter management server user information 600 is managed by the user management unit 513 of the matter management server 103, and may be stored in a plurality of locations such as the RAM 202, the ROM 203 or the external memory or the like connected to external memory I/F 204.

(Matter Information 610)

The matter information 610 illustrates information related to a matter stored in the matter management server 103. The matter information 610 includes a matter ID 611 that is allocated to the matter, a matter name 612 that is the name of the matter, and a responsible party user ID 613 that is the responsible party for the matter. In addition to information as illustrated in FIG. 6B, the matter information 610 may also include matter related information such as the processing deadline for the matter and the validity limit, matter detailed information showing detailed information for the matter, or the like. The matter information 610 is processed by the matter management unit 511 of the matter processing server 103, and may be stored in a plurality of locations such as the RAM 202, the ROM 203 or the external memory or the like connected to external memory I/F 204.

(Costs Information 620)

The costs information 620 illustrates information related to costs used in relation to invoicing costs for a matter stored in the matter management server 103. The costs information 620 includes a matter ID 621 that is allocated to the matter, a costs ID 622 that is linked to the matter ID, a costs name 623 that is the name of the costs, a costs value 624 that is the value of the costs, and a unit 625 that shows the unit of the costs value. In addition to information as illustrated in FIG. 6C, the costs information 620 may also include costs invoicing information such as the invoicing address for costs, deadlines related to payment deadlines for costs, or the like. The costs information 620 is processed by the costs management unit 512 of the matter processing server 103, and may be stored in a plurality of locations such as the RAM 202, the ROM 203 or the external memory or the like connected to external memory I/F 204.

(Document Information 630)

The document information 630 illustrates information related to documents in relation to a matter stored in the matter management server 103. The document information 630 includes a matter ID 631 that is allocated to the matter, a document ID 632 that is allocated to each document, a document name 633 that is the name of the document, and a document file 634 that is the file name of the document. Although the document file 634 is shown in file format, position information may be included for the document file that is stored in an external memory or the like that is connected to the external memory I/F 204. In addition to information as illustrated in FIG. 6D, the document information 630 of the matter management server 103 may also include document attribute information or the like such as the file size, the number of pages in the document, or the like. The document information 630 is managed by the document management unit 514 of the matter processing server 103, and may be stored in a plurality of locations such as the RAM 202, the ROM 203 or an external memory or the like connected to external memory I/F 204.

(Cooperation Server User Information 640)

The cooperation server user information 640 illustrates information related to a user that uses the cooperation server 104. The cooperation server user information 640 includes a cooperation server user ID 641 that is allocated to the user of the cooperation server 104, and a cooperation server password 642 that is used in user authentication. The cooperation server user information 640 also includes matter management server user ID 643 that is user information for the matter management server 103, printing server user ID 645 that is user information for the printing server 105, and printing server password 646 that is used in user authentication. In addition to information as illustrated in FIG. 7A, the cooperation server user information 640 may also include user related information such as the user name, address or the like related to the cooperation server user, individual setting information for the cooperation server, access right setting information or the like. The cooperation server user information 640 is managed by the user management unit 522 of the cooperation server 104, and may be stored in a plurality of locations such as the RAM 202, the ROM 203 or an external memory or the like connected to external memory I/F 204.

(Cooperation Information 650)

The cooperation information 650 illustrates information related to cooperation information related to cooperation between the matter management server and the printing server. The cooperation information 650 includes a matter ID 651, a matter name 652, and a matter management server user ID 653. The cooperation information 650 also includes a printing ID 654 that is issued when the information control unit 523 orders printing of a document file, a monetary amount 655 that shows the printing monetary amount for the document file, a document name 656, a document file 657, and a printing file 658 that is a file in which the document file is PDL processed. In addition to the information as illustrated in FIG. 7B, the cooperation information 650 can be managed by linking costs information other than the printing costs described below. Furthermore, the cooperation information 650 may also include cooperation state information that indicates the state of progress of printing or the communication state of the linking process, cooperation related information such as the cooperation related server state information that indicates the state of the printing server 105 or the matter management server 103, or the like. Information processing between the printing server 105 and the matter management server 103 may be cooperated since the cooperation server 104 manages the cooperation information 650 as illustrated in FIG. 7B. The cooperation information 650 is managed by the cooperation information management unit 521 of the cooperation server 104, and may be stored in a plurality of locations such as the RAM 202, the ROM 203 or the external memory or the like connected to external memory I/F 204.

(Printing Server User Information 660)

The printing server user information 660 illustrates information related to a user that uses the printing server 105. The printing server user information 660 includes a printing server user ID 661 that is allocated to the user of the printing server 105, and a printing server password 662 that is used in user authentication. In addition to information as illustrated in FIG. 7C, the printing server user information 660 may also include user related information such as the user name, address or the like related to the printing server user, individual setting information for the printing server, access right setting information of the printing server, or the like. The printing server user information 660 is processed by the user management unit 533 of the printing server 105, and may be stored in a plurality of locations such as the RAM 202, the ROM 203 or an external memory or the like connected to external memory I/F 204.

(Printing Information 670)

The printing information 670 illustrates information related to printing documents stored in the printing server 105. The printing information 670 includes a printing ID 671 that is allocated to a job for document printing that the printing server 105 has received from the cooperation server 104, a monetary amount 672 that is the printing monetary amount produced by document printing, and a printing file 673 that document printing has been requested. The printing file 673 is in PDL format, and may contain position information for the printing file that is stored on an external memory or the like that is connected to the external memory I/F 204. In addition to information as illustrated in FIG. 7D, the printing information 670 of the printing server 105 may also include document attribute information or the like such as the file size, the number of pages in the document, printing state information indicating the printing state, or the like. The printing information 670 is managed by the printing information management unit 531 of the printing server 105, and may be stored in a plurality of locations such as the RAM 202, the ROM 203 or the external memory or the like connected to external memory I/F 204.

(Charging Information 680)

The charging information 680 illustrates charging information for calculation of the costs related to printing execution by the printing serer 105 by use of the MFP 107. The charging information 680 includes the color 681, the size 682 and the monetary amount 683 that constitute the conditions for charging. The various monetary values of the monetary amount 683 are set depending on the type of the size 682 or the type of color 681. In addition to charging information of the printing server 105 as illustrated in FIG. 7E, the charging information 680 of the printing server 105 may also include charging condition information such as the file size or page number of a document that forms the basis of a charging unit, the finishing settings, or the like, delivery monetary amount information, discount price information, or the like. The charging information 680 is managed by the charging management unit 532 of the printing server 105, and may be stored in a plurality of locations such as the RAM 202, the ROM 203 or the external memory or the like connected to external memory I/F 204.

(Position Information 690)

The position information 690 illustrates position information acquired by use of the position acquisition unit 309 of the mobile terminal 106. The position information 690 includes the location name 691 that is the name allocated to respective locations such as a law firm, a latitude 692 and a longitude 693 that indicate a position. In the present embodiment, printed materials are acquired in a responsible party at "LL Law Firm" as shown by the location name 691. However, there is no limitation in this regard, and the location name 691 may be position information for a reference point. Details of the reference point will be described in the second embodiment. In addition to information as illustrated in FIG. 7F, the position information 690 may also include position-related information such as an address of a location. The position information 690 is managed by the position information management unit 544 of the mobile terminal 106, and may be stored in a plurality of locations such as the RAM 302, the ROM 303 or the external memory or the like connected to external memory I/F 304.

Using FIG. 8 to FIG. 14, an example of a screen displayed on the display of the client PC 102, the mobile terminal 106, or the MFP 107 will be described. The display process of the screen is executed by a display connected to the display unit I/F 207, 307 or 407 based on an order from the CPU 201, 301, or 401 of the respective devices. The input operation of a user of the screen is performed using a keyboard, a mouse, a pointing device, or various types of hardware keys, or the like connected to the input I/F 205, 305, or 405.

Matter Management Server Login Screen 700

FIG. 8 is an exemplary figure describing a matter management server login screen 700 displayed on a display or the like connected to a display unit I/F 207 of the client PC 102. This screen is displayed on a display by execution of a web browser program on the client PC 102 based on an order from the CPU 201. The matter management server login screen 700 includes a user ID input box 701, a password input box 702, an OK button 703, or the like.

When a user logs into the matter management server 103, the respective user ID input box 701 and a password input box 702 are the input boxes for input of the user ID and the password for user authentication. The OK box 703 is the button that is pressed by a user when executing login to the matter management server 103. When the user presses the OK button 103, the operation control unit 501 detects the user ID and the password input on the matter management server login screen 700, and sends the detected user ID and password to the information control unit 516.

(Document Printing Screen 800)

FIG. 9 is an exemplary figure to describe a document printing screen 800 displayed on a display or the like of the client PC 102. The display process of this screen is displayed on a display by execution of a web browser program on the client PC 102 based on an order from the CPU 201. The document printing screen 800 includes a matter selection list box 801, a printing document selection check box 802, a matter name 803, a document name 804, a document file name 805, a printing button 806, or the like. In FIG. 9, although two respective printing document selection check boxes 802, matter names 803, document names 804, or document file names 805 are illustrated, there is no limitation in this regard, and examples of one or a plurality of these items may be given.

The matter selection list box 801 is the list box for selection of the matter when the document related to the matter is printed by the user. The printing document selection check box 802 is the check box for selection of the document that is to be printed by the user. The printing button 806 is the button that is pressed by a user when executing the printing of a document that is input by a user. When the user presses the printing button 806, the operation control unit 501 detects the matter and the document input on the document printing screen 800 and sends the detected matter and document to the information control unit 546. The respective matter name, document name and document file name are displayed in the matter name 803, the document name 804 and the document file name 805 based on the document information received from the matter management server 103.

(Printing Order Notification Email 900)

FIG. 10 illustrates an example of a printing order notification email 900 sent to the responsible party user of a matter when a user has given a document printing instruction. The information control unit 524 of the cooperation server 104 receives a document printing instruction through the information control unit 516. The information control unit 524 prepares a printing order notification email 900 after sending the document PDL file to the printing server 105, and sends the printing order notification email 900 through the network control unit 525 to the mobile terminal 106. The information control unit 546 of the mobile terminal 106 for example periodically receives the newly arrived email from the mail server (not illustrated) through the network control unit 547. The printing order notification email 900 is displayed on a display by execution of a web browser program on the mobile terminal 106 based on an order from the CPU 301.

The printing order notification email 900 includes a responsible party user name 901, a matter name 902, document information 903, a costs registering screen URL 904, or the like. Although FIG. 10 illustrates one responsible party name 901, one matter name 902, three items of document information 903, and one costs registering screen URL 904, this configuration is merely exemplary. The responsible party user name 901, the matter name 902, and the document information 903 are the document printing instruction details executed by a user to the matter management server 103. A user name 602 of the responsible party user, a matter name 612, a document name 633, and a printing ID 671 are set in relation to 901, 902, and 903. The printing ID is the printing ID 671 for each document sent by the printing server 105 to the cooperation server 104 when a printing order is outputted from the cooperation server 104 to the printing server 105.

The costs registering screen URL 904 is the URL for a user to register the costs information after a user or responsible party has input the printing ID 671 by the MFP 107 and printing of a document has been printed. When the user accesses the URL, the costs information registering screen 1200 illustrated in FIG. 13 is sent from the cooperation server 104 to the mobile terminal 106. The costs registering screen URL 904 sets the matter ID 651 and the printing ID 654 as parameters in addition to the host name and the network address of the cooperation server by the information control unit 524. The operation control unit 541 detects that the costs registering screen URL 904 has been pressed by a user through a display connected to the display unit I/F 307, a pointing device, or hardware key connected to the input I/F 305 and sends the detection information to the information control unit 546. The information control unit 546 at this time sends the matter ID 651 and the printing ID 654 stated in the costs registering screen URL 904 through the network control unit 547 to the cooperation server 104 stated in the costs registering screen URL 904.

(Printing Execution Screen 1000)

FIG. 11 illustrates an example of a printing execution screen displayed on a display or the like of the MFP 107. The printing execution screen 1000 includes a printing ID input box 1001, a printing execution button 1002, or the like. The printing ID input box 1001 is an input box for input of the printing ID for specifying of the document to be printed in order for a user to use the MFP 107 to print a document file that is stored in the printing server 105. The printing execution button 1002 is a button that is pressed by a user when executing printing of a document file specified by a printing ID input by a user. When the user presses the printing execution button 1002, the operation control unit 551 detects the printing ID input on the printing execution screen 1000, and sends the detected printing ID to the information control unit 554.

(Printing Costs Information Screen 1100)

Figure 12:
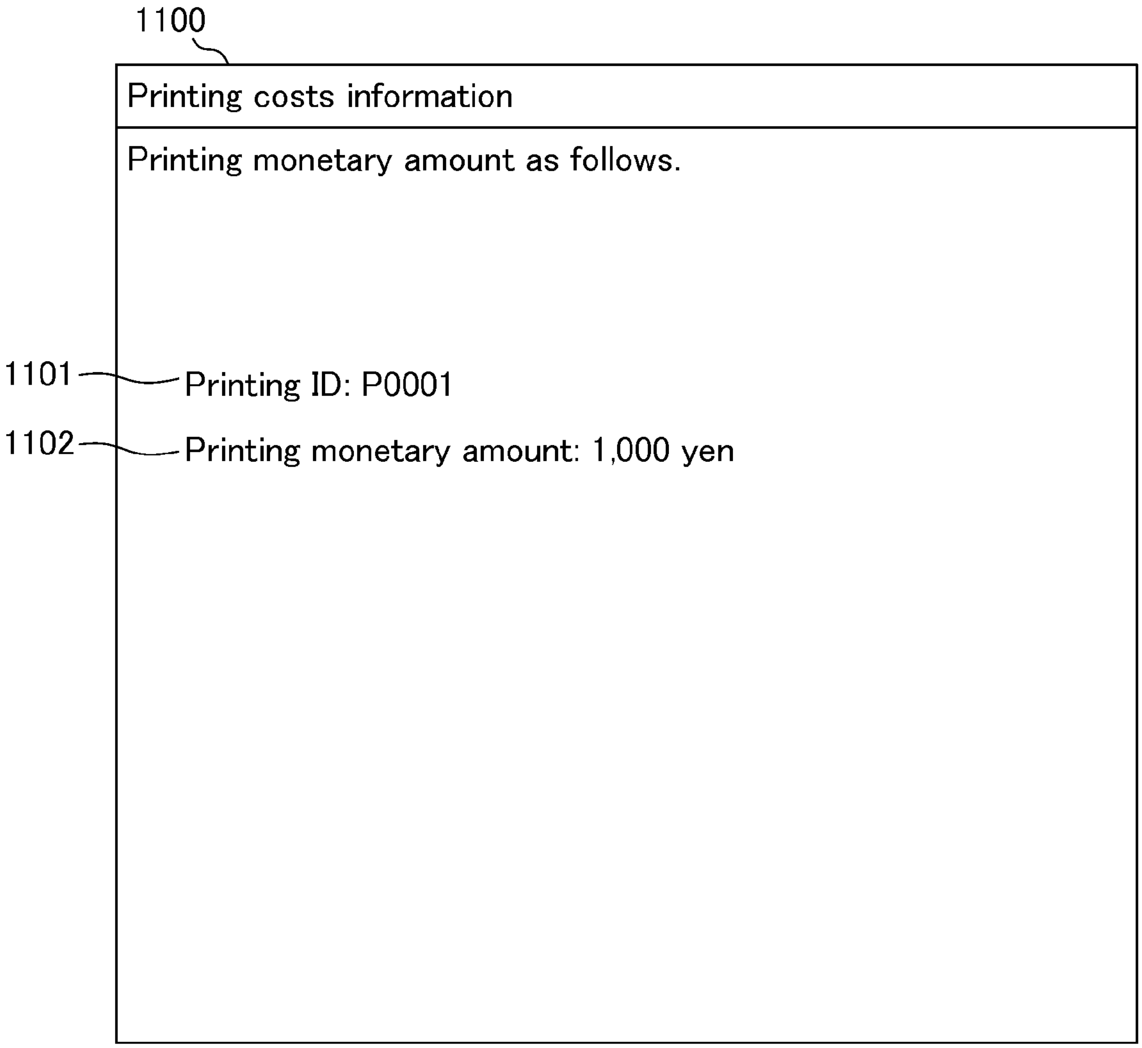
FIG. 12 illustrates an example of a costs information display screen displayed on the display.

FIG. 12 illustrates an example of a printing costs information screen displayed on a display or the like of the MFP 107. The printing costs information screen 1100 includes a printing ID 1101, a printing monetary amount 1002, or the like. The information control unit 554 displays the respective printing ID 1101 and printing monetary amount 1002 based on the printing ID 671 and the printing monetary amount 672 calculated using the charging information 680 contained in the printing information 670 received from the printing server 105.

(Costs Information Registering Screen 1200)

FIG. 13 illustrates an example of a costs information registering screen displayed on a display or the like of the mobile terminal 106. The costs information registering screen 1200 includes a matter information display 1201, a printing information display 1202, and a printing information details display 1203, or the like. The costs information registering screen 1200 includes an other costs information display 1204, an other costs information item input box 1205, an other costs information monetary amount input box 1206, an other costs information item addition button 1207, an OK button 1206, or the like.

The matter information display 1201, the printing information display 1202, and the printing information details display 1203 represent information acquired by the information control unit 525 of the cooperation server 104 from the cooperation information cooperation information management unit 521 based on the printing ID and the matter ID stated in the URL. The information control unit 546 receives the information from the cooperation server 104 and displays the same on the display. The printing information details display 1203 displays a printing ID 671, a monetary amount 672 and a total monetary amount calculated by totaling the respective amounts. Although the printing information details display 1203 as illustrated in FIG. 13 only displays detailed information for two matters, the displayed number of matters is determined with respect to the number of matters.

The input box is displayed on the other costs information display 1204 so that a user instruct registration on the mobile terminal 106 and registers, for example, transportation costs and personnel costs that are produced in addition to the printing monetary amount to the matter server 103 through the cooperation server 104 on. The other costs information item input box 1205 is the input box for input of a costs item produced in addition to the printing monetary amount. The other costs information monetary amount input box 1206 is an input box for input of a monetary amount in relation to the other costs information item input box 1205. That is to say, the other costs information item input box 1205 and the other costs information monetary amount input box 1206 function as a setting item for costs information other than the printing costs information.

The other costs information item addition button 1207 is the button that is pressed when the user uses the mobile terminal 106 to add an input matter number for the other costs information item input box 1205 and the other costs information monetary amount input box 1206. When the user presses the other costs information item addition button 1207, the operation control unit 541 displays one additional matter on the other costs information item input box 1205 and the other costs information monetary amount input box 1206. The OK button 1208 is the button that a user presses when performing a registration through the cooperation server 104 on the matter management server 103 of other costs information displayed on the other costs information display 1204 and printing formation 670 displayed on the printing information display 1202. When the user presses the OK button 1208, the operation control unit 541 detects the other costs information item and the other costs information monetary amount input by a user on the costs information registering screen 1200. Thereafter the operation control unit 541 sends the detected other costs information item and the other costs information monetary amount to the information control unit 546.

(Matter Information Screen 1300)

FIG. 14 illustrates an example that describes a matter information screen displayed on the display or the like of a client PC 102. The matter information screen 1300 includes a matter name 1301, a costs name 1302, a costs value 1303, and a unit 1304. The matter name 1301 displays the matter name that is included in the matter information 610 received by the information control unit 502 from the matter management server 103. The costs name 1302, the costs value 1303, and the unit 1304 display the costs name 623, the costs value 624, and the unit 625 included in the costs information 620 received by the information control unit 502 from the matter management server 103.

(Matter Management Server Login Process)

The login process onto the matter management server 103 by the client PC 102 in the present embodiment will be described making reference to the flowchart illustrated in FIG. 15. The programs in the client PC 102 and the matter management server 103 according to the present flow of operations are stored in the ROM 203 or an external memory connected to the external memory I/F 204, and are read by the RAM 202 and executed by the CPU 201.

Figure 15:
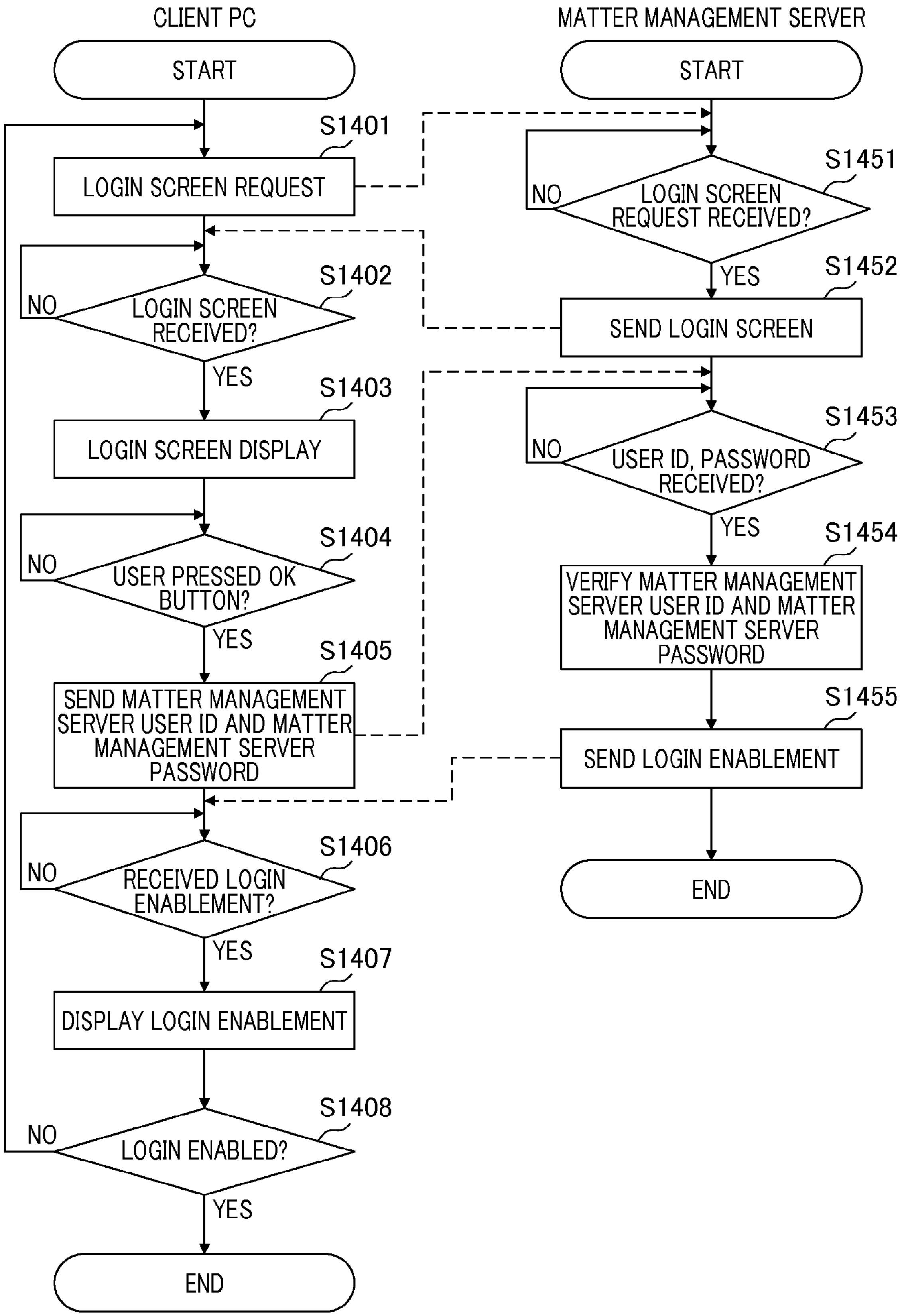
FIG. 15 illustrates a flowchart of the matter management server login process.

As illustrated in FIG. 15, the processing of the client PC 102 is such that, in S1401, the information control unit 502 requests the matter management server 103 a matter management server login screen 700 through the network control unit 503. That is to say, in S1401, on the matter management server 103 side in S1454, the information control unit 516 determines whether or not a login screen request has been received. The processing then proceeds to the step in S1402. In S1402, the information control unit 502 determines whether the matter management server login screen 700 illustrated in FIG. 8 has been received through the network control unit 503. When it is determined that the matter management server login screen 700 has not been received by the information control unit 502, the processing again proceeds to S1402, and when it is determined that the screen has been received, the processing then proceeds to the step in S1403. In S1403, the information control unit 502 orders the operation control unit 501 to display the matter management server login screen 700. In S1404, the operation control unit 501 determines whether or not the user has pressed the OK button 703 on the matter management server login screen 700. When the operation control unit 501 determines that the OK button 703 has not been pressed, the processing again proceeds to the step in S1404, and when it is determined that the button has been pressed, the operation control unit 501 detects the details of the user information that are input by a user on the matter management server login screen 700. Then the operation control unit 501 sends the detected details to the information control unit 502.

In S1405, the information control unit 502 sends the user information acquired in S1404 through the network control unit 503 to the matter management server 103. That is to say, in S1405, on the matter management server 103 side in S1453, the information control unit 516 determines whether or not the user information has been received. In S1406, the information control unit 502 determines whether or not the information control unit 502 has received login enabling information through the network control unit 503. When it is determined that the information control unit 502 has not received login enabling information, the processing proceeds again to S1406, and when it is determined that the information has been received, the processing proceeds again to S1407. In S1407, the information control unit 502 orders the operation control unit 501 to display login enablement on the matter management server login screen 700. In S1408, the information control unit 502 determines whether or not the login enabling information indicates enabled login. When it is determined by the information control unit 502 that the login enabling information has not enabled login, the processing proceeds again to S1401, and when it is determined that the login enabling information indicates enabled login, the processing is ended.

As illustrated in FIG. 15, in S1415, on the matter management server 103 side, the information control unit 516 determines whether or not a request for the matter management server login screen 700 has been received through the network control unit 517 from the client PC 102. When it is determined that the information control unit 516 has not received a request for the matter management server login screen 700, the processing again proceeds to S1451, and when it is determined that the request has been received, the processing proceeds to S1452. In S1452, the information control unit 516 sends the document printing screen 800 from the network control unit 517 to the client PC 102. That is to say, in S1452, on the client PC 102 side in S1402 the information control unit 502 determines whether or not the login screen has been received.

In S1453, the information control unit 516 determines whether or not the user information has been received through the network control unit 517 from the client PC 102. When it is determined that the user information has not been received, the processing proceeds again to S1453, and when it is determined that the information has been received, the processing proceeds to S1454. In S1454, the information control unit 516 verifies that the user information received in S1453 is correct. The information control unit 516 acquires the user ID from the user information received in S1453 and sends the user ID as a user ID 601 to the user management unit 513 and orders the reading of the matter management server user information 600 in relation to the matter management server user ID 601. The user management unit 513 reads the matter management server user information 600 corresponding to the received matter management server user ID 601 and sends the same to the information control unit 516. The information control unit 516 acquires the matter management server password 603 from the received matter management server user information 600, and verifies that the password corresponds to the user information received in S1453. When the information control unit 516 determines that the two passwords correspond, the login enablement information is enabled login, and when it is determined that the two passwords do not correspond, the login enablement information is not enabled login. Then the processing proceeds to S1455. In S1455, the information control unit 516 sends the login enablement information set in S1454 through the network control unit 517 to the client PC 102. That is to say, in S1455, the information control unit 502 determines whether or not the client PC 102 has received login enablement in S1406. Then the processing is ended.

(Document Printing Instruction Process)

The document printing instruction process to the matter management server 103 by the client PC 102 in the present embodiment will be described making reference to the flowchart illustrated in FIG. 16. The respective programs in the client PC 102 and the matter management server 103 according to the present flow of operations are stored in the ROM 203 or an external memory connected to the external memory I/F 204, and are read by the RAM 202 and executed by the CPU 201.

Figure 16:
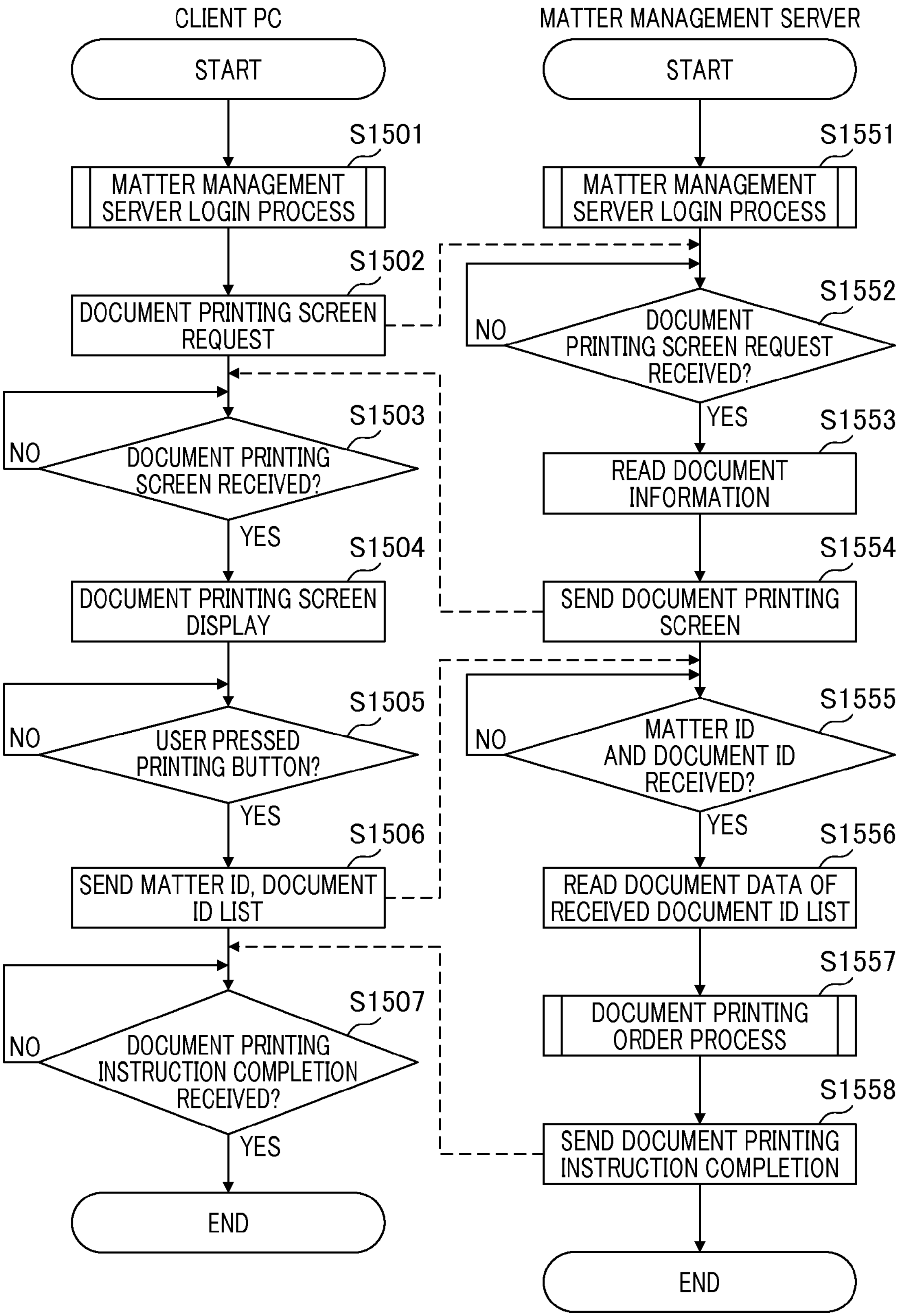
FIG. 16 illustrates a flowchart of the document printing instruction process.

As illustrated in FIG. 16, the information control unit 502 executes the matter management server login process described in detail in FIG. 15 on the client PC 102. Then the processing proceeds to S1502. In S1502, the information control unit 502 requests a document printing screen 800 from the matter management server 103 through the network control unit 503. That is to say, in S1502, on the matter management server 103 side in S1552, the information control unit 516 determines whether or not a document printing screen request has been requested. Then the processing proceeds to S1503. In S1503, the information control unit 502 determines whether or not the document printing screen 800 in FIG. 9 has been received from the matter management server 103. When it is determined that the document printing screen 800 has been not received, the processing proceeds again to S1503, and when it is determined that the screen has been received, the processing proceeds to S1504. In S1504, the information control unit 502 orders the operation control unit 501 to display the document printing screen 800. In S1505, the operation control unit 501 determines whether or not the printing button 806 on the document printing screen 800 has been pressed by the user. When it is determined that the printing button 806 has not been pressed, the processing proceeds again to S1505, and when the operation control unit 501 determines that the printing button 806 has been pressed, the operation control unit 501 detects and sends the details of the document information 620 and the matter information 610 input by the user on the document printing screen 800 to the information control unit 502.

In S1506, the information control unit 502 sends the document information 620 and the matter information 610 acquired in S1505 through the network control unit 503 to the matter management server 103. That is to say, in S1506, on the matter management server 103 in S1555, the control unit 516 determines whether or not the document information and the matter information have been received. Then in S1507, the information control unit 502 determines whether or not the document printing instruction completion has been received through the network control unit 503 from the matter management server 103. When the information control unit 501 determines that the document printing instruction completion has not been received, the processing proceeds again to S1507, and when it is determined that the information has been received, the processing is ended.

As illustrated in FIG. 16, in S1551, the information control unit 516 of the matter management server 103 executes the matter management server login process described in detail in FIG. 15 on the client PC 102. In S1552, the information control unit 516 determines whether or not the request for the document printing screen 800 has been received through the network control unit 517 from the client PC 102. When the information control unit 516 determines that the request for the document printing screen 800 has not been received, the processing proceeds again to S1552, and when it is determined that the request has been received, the processing proceeds to S1553.

In S1553, the information control unit 516 acquires the matter management server user ID 601 from the matter management server user information 600 for the currently logged in user that was received in S1454 from the user management unit 513. The information control unit 516 sends the acquired matter management server user ID 601 to the matter management unit 511 and orders reading of the matter information 610 in which the matter management server user ID 601 coincides with the responsible party user ID 613. The matter management unit 511 acquires the received matter information 610 in which the matter management server user ID 601 coincides with the responsible party user ID 613, and sends the information 610 to the information control unit 516. The information control unit 516 sends the received matter information 610 to the document management unit 514, and orders acquisition of the document information 630 that coincides with the matter ID 611 of the matter information 610. The document management unit 514 acquires the document information 630 corresponding to the received matter ID 611 and sends the same to the information control unit 516.

In S1554, the information control unit 516 prepares a document printing screen 800 using the document information 630 and the matter information 610 received in S1553, and sends the same through the network control unit 517 to the client PC 102. That is to say, in S1554, on the client PC 102 in S1503 side, the information control unit 503 determines whether or not the document printing screen has been received. In S1555, the information control unit 516 determines whether or not the matter ID 611 and the document ID 632 for printing have been received from the client PC 102 through the network control unit 517. When the information control unit 516 determines that the matter ID 611 and the document ID 632 for printing have not been received, the processing proceeds again to S1555, and when it is determined that the information has been received, the processing proceeds to S1556. In S1556, the information control unit 516 sends the document ID 632 received in S1555 to the document management unit 514, and orders reading of the document information 630 that corresponds to the document ID 632 and the associated document file. The document management unit 514 reads the document information 630 that corresponds to the received document ID 632 and the associated document file, and sends the same to the information control unit 516. In S1557, the information control unit 516 executes a document printing order to the printing server 105 and the cooperation server 104 as described below with reference to FIG. 17. Then the processing proceeds to S1558. In S1558, the information control unit 516 sends the document printing instruction completion from the network control unit 517 to the client PC 102. That is to say, in S1558, in S1507 on the client PC 102 side, the information control unit 502 determines whether or not the document printing instruction completion has been received. Then the processing is ended.

(Document Printing Order Processing)

The document printing order process between the matter management server 103, the cooperation server 104 and the printing server 105 in the present embodiment will be described making reference to the flowchart illustrated in FIG. 17. The respective programs in the matter management server 103, the cooperation server 104 and the printing server 105 according to the present flow of operations are stored in the ROM 203 provided in the respective devices or in an external memory connected to the external memory I/F 204, and are read by the RAM 202 and executed by the CPU 201 provided in the respective devices.

Figure 17:
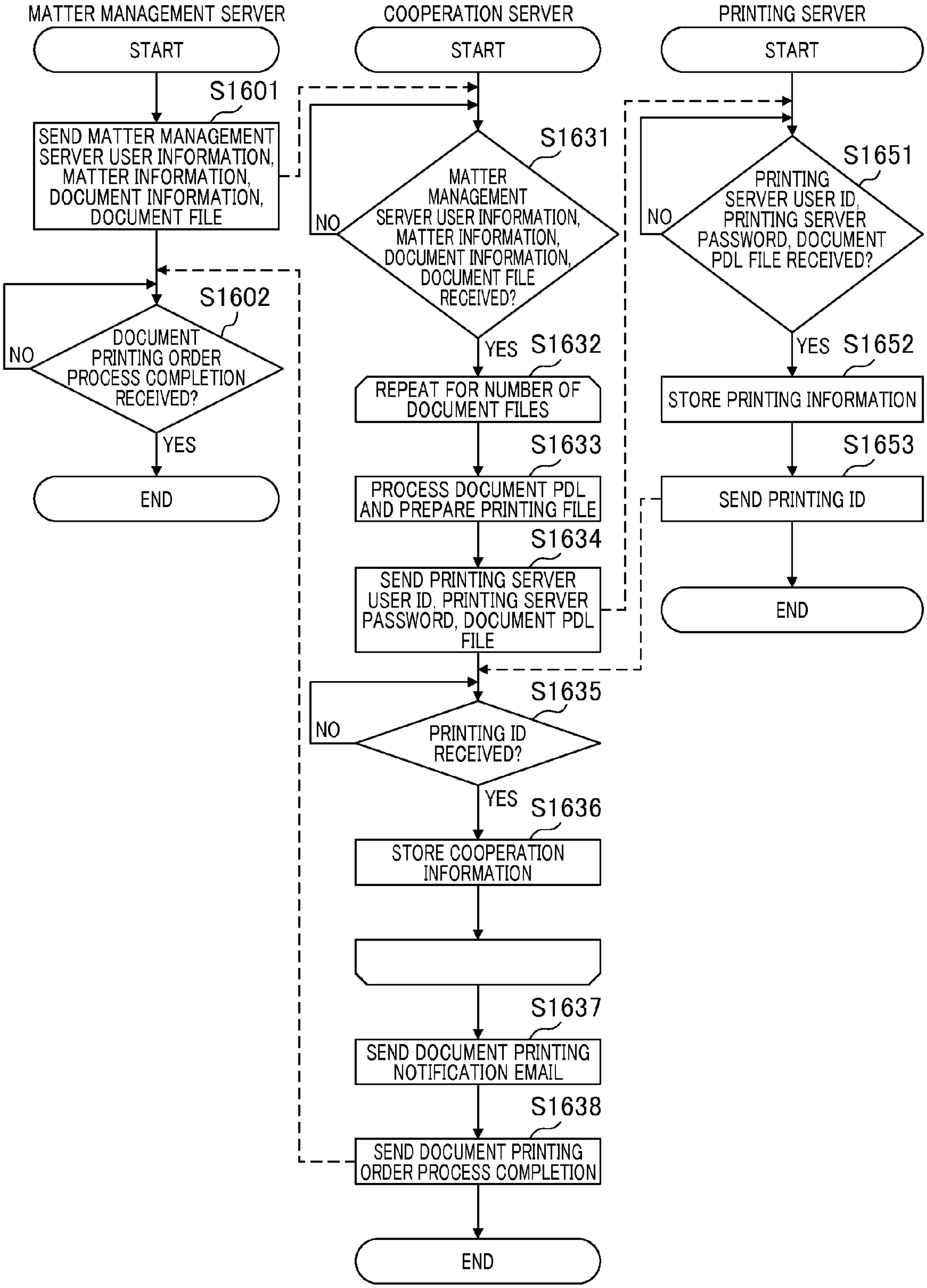
FIG. 17 illustrates a flowchart of the document printing order process.

In the matter management server 103, as illustrated in FIG. 17, S1601, the information control unit 516 sends the matter management server user information 600 acquired in the document printing instruction process described with reference to FIG. 16 through the network control unit 517 to the cooperation server 104. The information control unit 516 sends the matter information 610, the document information 630 and the document file to the cooperation server 104. That is to say, in the step in S1601, on the cooperation server 104 in S1631, the information control unit 524 determines whether the sent information has been received. In S1602, the information control unit 516 determines whether or not the document printing order processing completion has been received from the cooperation server 104 through the network control unit 517. When the information control unit 516 determines that the document printing order processing completion has not been received, the processing proceeds again to S1602, and when it is determined that it has been received, the processing is ended.

The cooperation server 104 executes the processing illustrated in FIG. 17. In S1631, the information control unit 524 determines whether or not the matter management server user information 600, the matter information 610, the document information 630, and the document file have been received from the matter management server 103 through the network control unit 525. When the information control unit 524 determines that the matter management server user information 600, the matter information 610, the document information 630, and the document file have not been received, the processing proceeds again to S1631, and when it is determined that they have been received, the processing proceeds to S1632.

In S1632, the information control unit 524 repeats the execution of the steps from S1633 to S1636 corresponding to the number of document files acquired in S1631. In S1633, the information control unit 524 sends the document files received in S1631 to the image processing unit 523, and orders conversion of the document file to a document PDL file. The image processing unit 523 receives the document file, converts the document file to a document PDL file, and sends the same to the information control unit 524. When the printing server 105 can convert the document file acquired in S1631 to a document PDL, the processing in S1633 is not performed, and the processing proceeds to S1634. Naturally, when a document file acquired in S1631 can be converted to printable data by the matter management server 103 or the MFP 107, in the same manner, a configuration is possible in which the processing in S1633 is not performed.

In S1634, the information control unit 524 sends the matter management server user ID 601 of the matter management server user information 600 received in S1631 to the user management unit 522. Then the information control unit 524 orders the user management unit 522 to read the cooperation server user information 640 corresponding to the matter management server user ID 643. When the matter management server user ID 601 is received, the user management unit 522 reads the cooperation server user information 640 corresponding to the received matter management server user ID 643, and sends the same to the information control unit 524. The information control unit 524 acquires the printing server user ID 645 and the printing server password 646 from the received cooperation server user information 640, and sends the same to the printing server 105 together with the document PDL file acquired in S1633. That is to say, in S1634, on the printing server 105 in S1651, the information control unit 534 determines whether or not the information sent has been received.

In S1635, the information control unit 524 determines whether or not the printing ID 671 has been received through the network control unit 525 from the printing server 105. When the information control unit 524 determines that the printing ID 671 has not been received, the processing proceeds again to S1635, and when it is determined that it has been received, the processing proceeds to S1636. In S1636, the information control unit 524 sends the matter management server user information 600 received and the matter information 610 in S1631, and the document information 630, the document file, and the document PDL file sent in S1634 to the cooperation information management unit 521. The information control unit 524 instructs the cooperation information management unit 521 to store the cooperation information 650. The information control unit 524 sends the printing ID 671 received in S1635 to the cooperation information management unit 521 and instructs storage of the cooperation information 650.

The cooperation information management unit 521 stores the received matter management server user information 600, the matter information 610, the document information 630, the document file, the document PDL file, and the printing ID 671 as cooperation information 650. The cooperation information management unit 521 sets the matter name 612 to the matter name 652 in the matter ID 651, and the matter ID 611 of the matter information 610 to the matter ID 651 of the cooperation information 650. The cooperation information management unit 521 sets the matter management server user ID 601 of the matter management server user information 600 to the matter management server user ID 653 of the cooperation information 650. The cooperation information management unit 521 sets the printing ID 671 of the printing information 670 to the printing ID 654 of the cooperation information 650. The cooperation information management unit 521 sets the document name 633 of the document information 630 to the document name 656 of the cooperation information 650. The cooperation information management unit 521 stores the document file in an external memory connected to the external memory I/F 204, and sets the storage address to the document file 657 of the cooperation information 650. The cooperation information management unit 521 stores the document PDL file in an external memory connected to the external memory I/F 204, and sets the storage address to the printing file 658 of the cooperation information 650. When storage of the cooperation information 650 is completed, the cooperation information cooperation information management unit 521 sends the storage completion to the information control unit 524. Then the processing proceeds to S1632.

In S1637, the information control unit 524 prepares a printing order notification email 900 based on the matter management server user information 600, the cooperation information 650 and the address of the cooperation server 104 itself, and sends the email to the mobile terminal 106. The information control unit 524 at this time sets the email address of the matter management server user information 600 to the address of the printing order notification email 900. The information control unit 524 sets the matter management server user name 602 of the matter management server user information 600 to the responsible party user name 901 of the printing order notification email 900. The information control unit 524 sets the matter name 652 of the cooperation information 650 to the matter name 902 of the printing order notification email 900, the document name 656 to the document name of the document information 903, and the printing ID 654 to the printing ID of the document information 903. The information control unit 524 configures the actual address of the cooperation server 104 as the network address, and sets the costs registering screen URL 904 using the matter ID 651 and the printing ID 654 of the cooperation information 650 as parameters. The information control unit 524 prepares the printing order notification email 900 and sends the printing order notification email 900 to the mobile terminal 106 through the network control unit 525.

In S1638, the information control unit 524 sends the document printing order processing completion to the matter management server 103. That is to say, in S1638, on the matter management server 103 side in S1602, the information control unit 524 determines whether or not the document printing order processing completion has been received. Then the processing is ended.

The processing as illustrated in FIG. 17 is executed in the printing server 105. In S1651, the information control unit 534 determines whether or not the printing server user ID 645, the printing server password 646 and the document PDL file have been received through the network control unit 535 from the cooperation server 104. When the information control unit 534 determines that the printing server user ID 645, the printing server password 646 and the document PDL file have not been received, the processing proceeds again to S1651, and when it is determined that such information has been received, the processing proceeds to S1652. In S1652, the information control unit 534 sends the printing server user ID 645 and the printing server password 646 received from the cooperation server 104 in S1651 to the user management unit 533, and orders verification. The user management unit 533 considers the received printing server user ID 645 as a printing server user ID 661, reads the corresponding printing server user information 660, verifies that correspondence with the received printing server password 662 corresponds to the printing server password 662 in the printing server user information 660, and sends the verification result to the information control unit 534. The information control unit 534 sends the document PDL file received in S1651 to the printing information management unit 531, and orders storage of the document PDL file. The printing information management unit 531 stores the received document PDL file, and sends the issued printing ID 671 to the information control unit 534. Then in S1653, the printing ID 671 that was received from the printing information management unit 531 in S1652 is sent to the cooperation server 104. That is to say, in S1635, on the cooperation server 104 side in S1653, the information control unit 524 determines whether or not the printing ID was received. Then the processing is ended.

(Printing Process)

The printing processing executed by the MFP 107 and the printing server 105 in the present embodiment will be described making reference to FIG. 18. The respective programs in the MFP 107 and the printing server 105 according to the present flow of operations are stored in the ROM 403, 203 or an external memory connected to the external memory I/F 404, 204, and are read by the RAM 402, 202 and executed by the CPU 401, 201.

Figure 18:
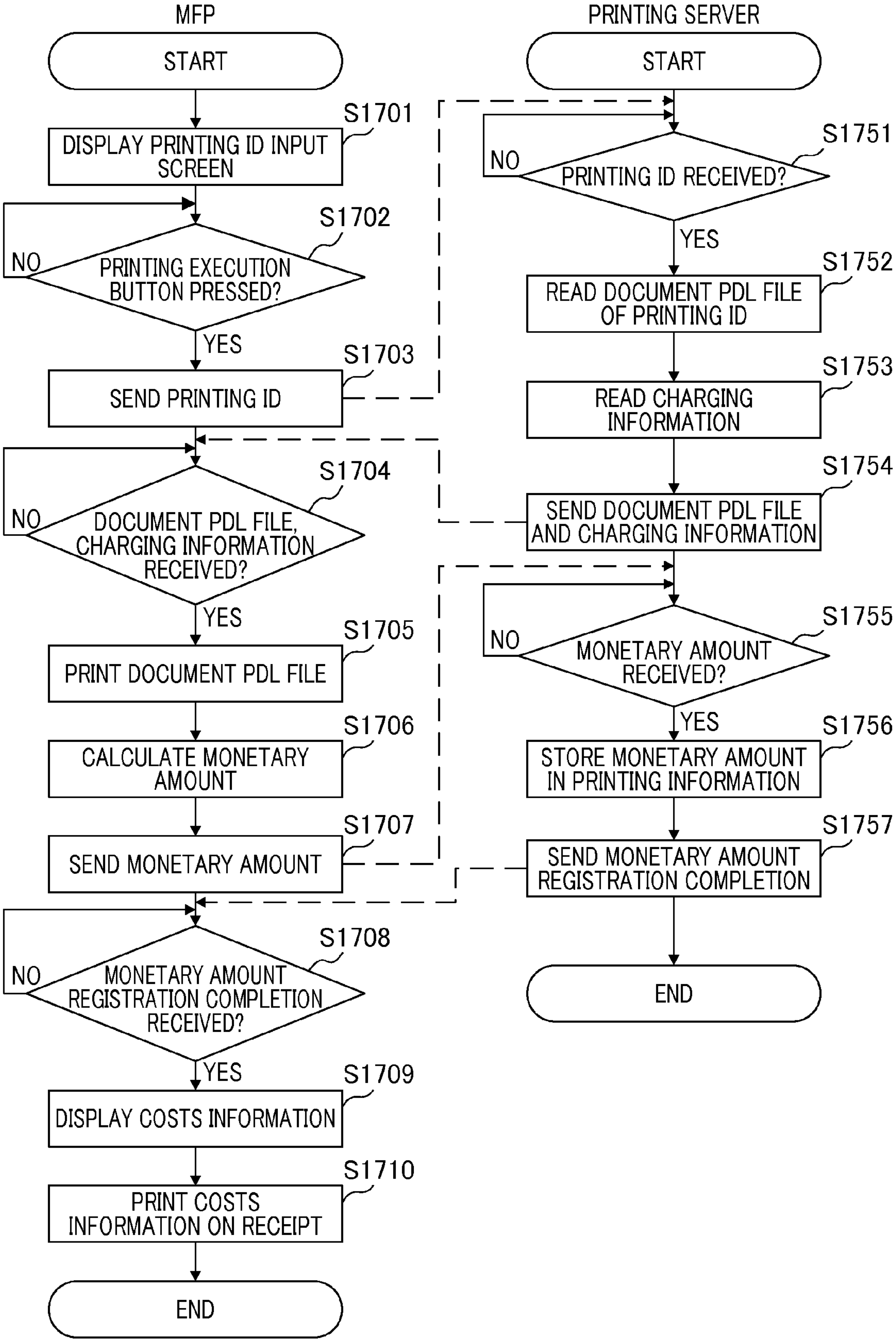
FIG. 18 illustrates a flowchart of the printing process.

In the MFP 107, as illustrated in FIG. 18, in S1701, the information control unit 554 orders the operation control unit 551 to display the printing execution screen 1000. In S1702, the information control unit 554 determines whether or not the printing execution button 1002 has been pressed by a user on the printing execution screen 1000. When the operation control unit 551 determines that the printing execution button 1002 has not been pressed, the processing proceeds again to S1702, and when it is determined that the printing execution button 1002 has been pressed, the operation control unit 551 detects the printing ID 671 input by a user on the printing execution screen 1000, and sends the same to the information control unit 554.

In S1703, the information control unit 554 sends the printing ID 671 acquired in S1702 from the network control unit 555 to the printing server 105. That is to say, in S1703, on the printing server 105 side in S1751, the information control unit 534 determines whether or not the printing ID has been received by. In S1704, the information control unit 554 determines whether or not the document PDL file and the charging information 680 have been received from the printing server 105 through the network control unit 555. When the information control unit 554 determines that the document PDL file and the charging information 680 have not been received, the processing proceeds again to S1704, and when the information control unit 554 determines that the document PDL file and the charging information 680 have been received, the processing proceeds to S1705.

In S1705, the information control unit 554 sends the document PDL file received in S1704 to the printing control unit 552, and orders execution of printing. The printing control unit 552 sends the received document PDL file to the printing unit 408 to thereby execute, and acquires the page number of the printing result and sending the same to the information control unit 554. Then in S1706, the information control unit 554 calculates the monetary amount from the printing page number acquired in S1705 and the charging information 680 received in S1704. In S1707, the information control unit 554 sends the monetary amount calculated in S1706 to the printing server 105. That is to say, in S1707, on the printing server 105 side in S1755, the information control unit 524 determines whether or not the printing monetary amount has been received. In S1708, the information control unit 554 determines whether or not the monetary amount registering completion notification has been received by the printing server 105. When the information control unit 554 determines that the notification has not been received, the processing proceeds again to S1708, and when the notification has been received, the processing proceeds to S1709.

In S1709, the information control unit 554 prepares a costs information display screen 1100 based on the calculated monetary amount, and orders the operation control unit 551 to display the screen. In S1710, the information control unit 554 uses the monetary amount calculated in S1706 and the printing ID 671 acquired in S1702 to order the receipt printing control unit 553 to print a receipt for the printing monetary amount 672. The receipt printing control unit 553 sends the printing monetary amount 672 to the receipt printing unit 409 to execute receipt printing and then sends the receipt printing result to the information control unit 554. Then the processing is ended.

In the printing server 105, as illustrated in FIG. 18, in S1751, the information control unit 534 determines whether or not the printing ID 671 has been received from the MFP 107 through the network control unit 535. When the information control unit 534 determines that the printing ID 671 has not been received, the processing proceeds again to S1751, and when it is determined that the printing ID has been received, the processing proceeds to S1752. In S1752, the information control unit 534 sends the printing ID 671 received in S1751 to the printing information management unit 531, and orders reading of the printing information 670 and the printing file that correspond to the printing ID 671. The printing information management unit 531 acquires the printing information 670 corresponding to the received printing ID 671, and sends the same to the information control unit 534. In S1753, the information control unit 534 orders the charging management unit 532 to read the charging information 680. The charging management unit 532 sends the acquired charging information 680 to the information control unit 554. In S1754, the information control unit 554 sends the printing information 670 and the printing file acquired in S1752, and the charging information 680 acquired in S1753 through the network control unit 535 to the MFP 107. That is to say, in S1754, on the MFP 107 side in S1704, the information control unit 554 determines whether or not the sent information has been received. In S1755, the information control unit 534 determines whether or not the printing monetary amount has been received from the MFP 107 through the network control unit 535. When the information control unit 534 determines that the printing monetary amount has not been received, the processing proceeds again to S1755, and when it is determined that the printing monetary amount has been received, the processing proceeds to S1756.

In S1756, the information control unit 534 sends the printing ID 671 acquired in S1751 and the printing monetary amount 672 received in S1755 to the printing information management unit 531. The information control unit 534 orders storage of the printing monetary amount 672 received in S1755 as the monetary amount 672 for the printing information corresponding to the printing ID 671 acquired in S1751. The printing information management unit 531 stores the received printing monetary amount 672 as the monetary amount 672 for the printing information 670 corresponding to the received printing ID 671, and sends the storage result to the information control unit 534. In S1757, the information control unit 534 notifies the MFP 107 of the monetary amount registering completion through the network control unit 535. That is to say, in S1757, on the MFP 107 side in S1708, the information control unit 554 determines whether or not the monetary amount registering completion has been received. Then the processing is ended.

(Costs Information Registering Instruction Process)

The costs information registering instruction processing between the mobile terminal 106, the cooperation server 104 and the printing server 105 according to the present embodiment will be described making reference to the flowchart illustrated in FIG. 19. The respective programs in the mobile terminal 106, the cooperation server 104 and the printing server 105 according to the present flow of operations are stored in the ROM 303, 203 or an external memory connected to the external memory I/F 304, 204, and are read by the RAM 302, 202 and executed by the CPU 301, 201.

Figure 19:
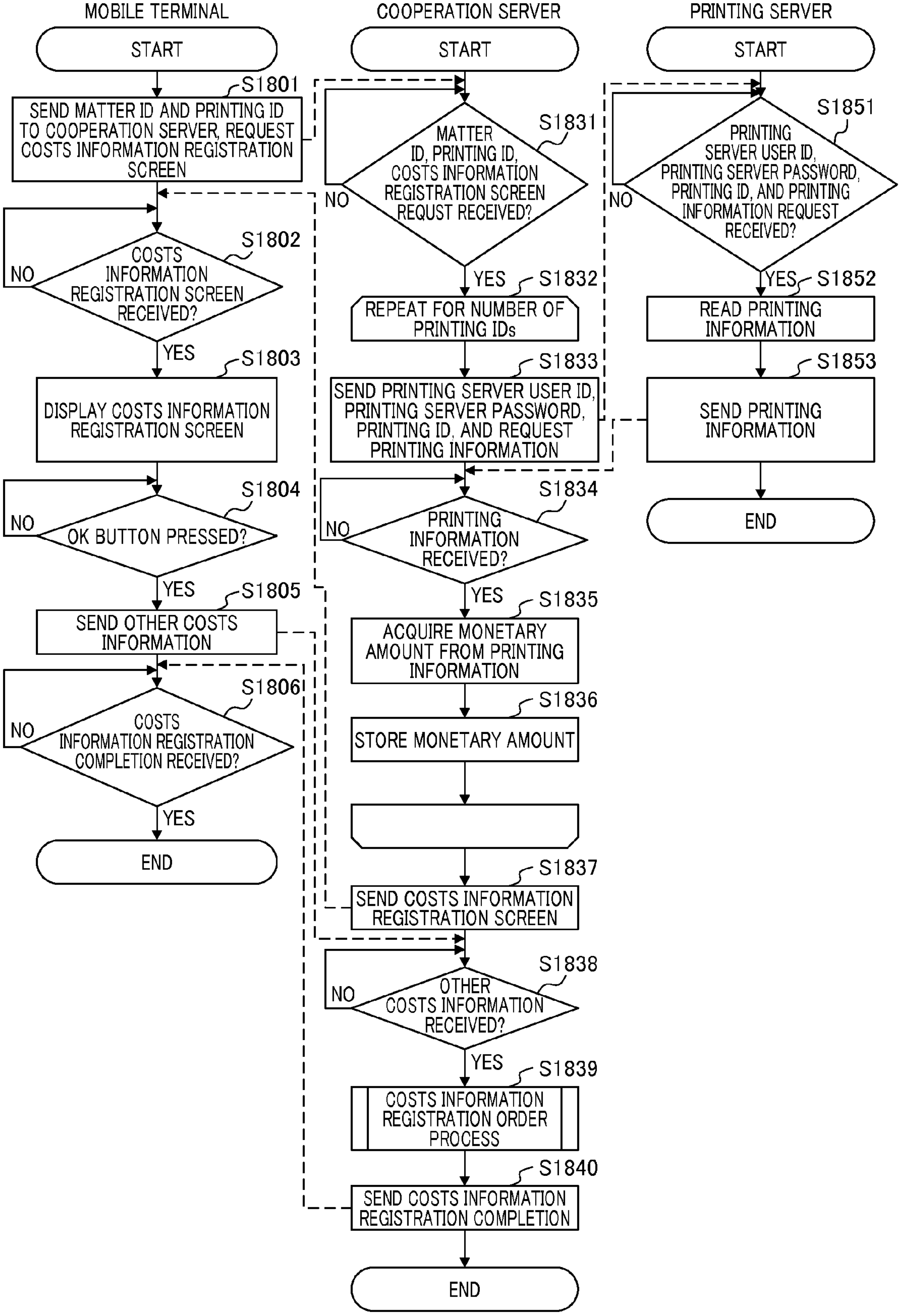
FIG. 19 illustrates a flowchart of the costs information registering instruction process.

In the mobile terminal 106, as illustrated in FIG. 19, in S1801, when the operation control unit 541 detects that a user has pressed the costs registering screen URL 904 of the printing order notification email 900, the costs registering screen URL 904 is sent to the information control unit 546. When the cooperation server 104 accesses cooperation server 104 that is shown in the address of the costs registering screen URL 904 received by the information control unit 546, the cooperation server 104 is notified of the matter ID 651 and the printing ID 654 shown in the costs registering screen URL 904. Then the information control unit 546 requests the cooperation server 104 a costs information registering screen 1200 as illustrated in FIG. 13. That is to say, in S1801, on the cooperation server 104 side in S1831, the information control unit 524 determines whether or not the information sent from the information control unit 546 has been received. In S1802, the information control unit 546 determines whether or not the costs information registering screen 1200 as illustrated in FIG. 13 has been received through the network control unit 535. When the information control unit 546 determines that the costs information registering screen 1200 has not been received, the processing proceeds again to S1802, and when it is determined that the screen has been received, the processing proceeds to S1803.

In S1803, the information control unit 546 orders the operation control unit 541 to display the costs information registering screen 1200 and the operation control unit 541 displays the screen. In S1804, the operation control unit 541 determines whether or not the user has pressed the OK button 1208 on the costs information registering screen 1200. When the operation control unit 541 determines that the OK button 1208 has not been pressed, the processing proceeds again to S1804, and when it is determined that the button has been pressed, the operation control unit 541 detects the presence or absence of content in relation to other costs information input by a user on the costs information registering screen 1200. When the input of other costs information is detected, the operation control unit 541 sends the input content to the information control unit 546.

In S1805, the information control unit 546 sends the other costs information acquired in S1804 to the cooperation server 104. The other costs information includes a matter name and other costs monetary amount. That is to say, in S1805, on the cooperation server 104 side in S1838, the information control unit 524 determines whether or not the other costs information has been received in S1838 by. In S1806, the information control unit 546 determines whether or not the costs information registering completion notification has been received from the cooperation server 104. When the information control unit 546 determines that the notification has not been received, the processing proceeds again to S1806, and when it is determined that the notification has been received, the processing is ended.

In the cooperation server 104, as illustrated in FIG. 19, in S1831, the information control unit 524 determines whether or not the matter ID 651, the printing ID 654 and the request for the costs information registering screen 1200 has been received through the network control unit 535. When the information control unit 524 determines that the matter ID 651, the printing ID 654 and the request for the costs information registering screen 1200 have not been received, the processing proceeds again to S1831, and when it is determined that that information has been received, the processing proceeds to S1832. In S1832, the information control unit 524 repeats the steps from S1833 to S1836 corresponding to the number of printing IDs 654 received in S1831.

In S833, the information control unit 524 sends the matter ID 651 and the printing ID 654 received in S1831 to the cooperation information management unit 521, and orders reading of the cooperation information 650 that is associated with the matter ID 651 and the printing ID 654. The cooperation information management unit 521 reads the cooperation information 650 of the received matter ID 651 and the printing ID 654, and sends the same to the information control unit 524. The information control unit 524 sends the matter management server user ID 653 of the received cooperation information 650 to the user management unit 522, and considers the matter management server user ID 653 as a matter management server user ID 643 to thereby order reading of the cooperation server user information 640. The user management unit 522 reads the cooperation server user information 640 associated with the matter management server user ID 653, and sends the same to the information control unit 524. The information control unit 524 sends the printing server user ID 645, the printing server password 646 and the printing ID 654 of the acquired cooperation information 650 and cooperation server user information 640 through the network control unit 525 to the printing server 105, and requests the corresponding printing information 670. That is to say, in S1833, on the printing server 105 side in S1851, the information control unit 534 determines whether or not the sent information has been received. In S1834, the information control unit 524 determines whether or not the printing information 670 associated with the printing ID 654 has been received from the printing server 105. When the information control unit 524 determines that the printing information 670 has not been received, the processing proceeds again to S1834, and when it is determined that the information has been received, the processing proceeds to S1835.

In S1835, the information control unit 524 acquires the printing monetary amount 672 from the printing information 670 acquired in S1834. In S1836, the information control unit 524 sends the printing ID 654 sent in S1833 and the printing monetary amount 672 acquired in S1834 to the linking information management unit 521, and orders storage of them by linking with the printing ID 654 in the monetary amount 655 of the cooperation information 650. The cooperation information management unit 521 links the received printing monetary amount 672 with the monetary amount 655 corresponding to the received printing ID 654 so as to store them, and sends the storage result to the information control unit 524. In S1837, the information control unit 524 prepares a costs information registering screen 1200 based on the cooperation server user information 640 and the cooperation information 650 acquired in S1833, and the printing information 670 acquired in S1834. The costs information registering screen 1200 prepared by the information control unit 524 is sent to the mobile terminal 106. That is to say, in S1837, on the mobile terminal 106 side in S1802, the information control unit 546 determines whether or not the costs information registering screen has been received.

When the mobile terminal 106 sends the other costs information in S1805, the information control unit 524 in S1838 determines whether or not the other costs information has been received from the mobile terminal 106. When the information control unit 524 determines that the other costs information has not been received, the processing proceeds again to S1838, and when it is determined that the other costs information has been received, the processing proceeds to S1839. In S1839, the information control unit 524 orders the cooperation information management unit 521 to link the costs information including the other costs information received from the mobile terminal 106 with the matter ID 651 and the printing ID 654 and to store them. Then the information control unit 524 executes a costs information registering order processing as illustrated in detail in FIG. 20. In S1840, the information control unit 524 notifies the mobile terminal 106 through the network control unit 525 of the costs information registering completion. That is to say, in S1840, the cooperation server 104 notifies the mobile terminal 106 of the costs information registering completion, and in S1806, the mobile terminal 106 determines whether or not the of the costs information registering completion has been received. Then the processing is ended.

The printing server 105 executes the processing illustrated in FIG. 19. In S1851, the information control unit 534 determines whether or not the printing server user ID 645, the printing server user password 646, the printing ID 654 and the printing information request have been received. When the information control unit 534 determines that the printing server user ID 645, the printing server user password 646, the printing ID 654 and the printing information request have not been received, the processing proceeds again to S1851, and when it is determined that the information has been received, the processing proceeds to S1852.

In S1852, the information control unit 534 sends the printing server user ID 645 and the printing server password 646 received from the cooperation server 104 in S1851 to the user management unit 533, and orders verification thereof. The user management unit 533 considers the received printing server user ID 646 as a printing server user ID 661, reads the managed printing server user information 660, verifies that printing server password 662 in printing server user information 660 corresponds to the received printing server password 662, and sends the verification result to the information control unit 534.

The information control unit 534 sends the printing ID 654 received in S1851 to the printing information management unit 531 and orders reading of the printing information 670 in which the printing ID 654 is managed as a printing ID 671. The printing information management unit 531 reads the printing information 670 in which the printing ID 654 is managed as a printing ID 671 and sends the result to the information control unit 534. In S1853, the printing information received from the printing information management unit 531 in S1852 is sent to the cooperation server 104. That is to say, in S1853, on the cooperation server 104 side in S1834, the information control unit 524 determines whether or not the printing information has been received. Then the processing is ended.

(Costs Information Registering Order Process)

The costs information registering order processing of the cooperation server 104 and the matter management server 103 according to the present embodiment will be described making reference to the flowchart illustrated in FIG. 20. The respective programs in the cooperation server 104 and the matter management server 103 according to the present flow of operations are stored in the ROM 203 provided in the respective devices, or in an external memory connected to the external memory I/F 204, and are read by the RAM 202 and executed by the CPU 201.

Figure 20:
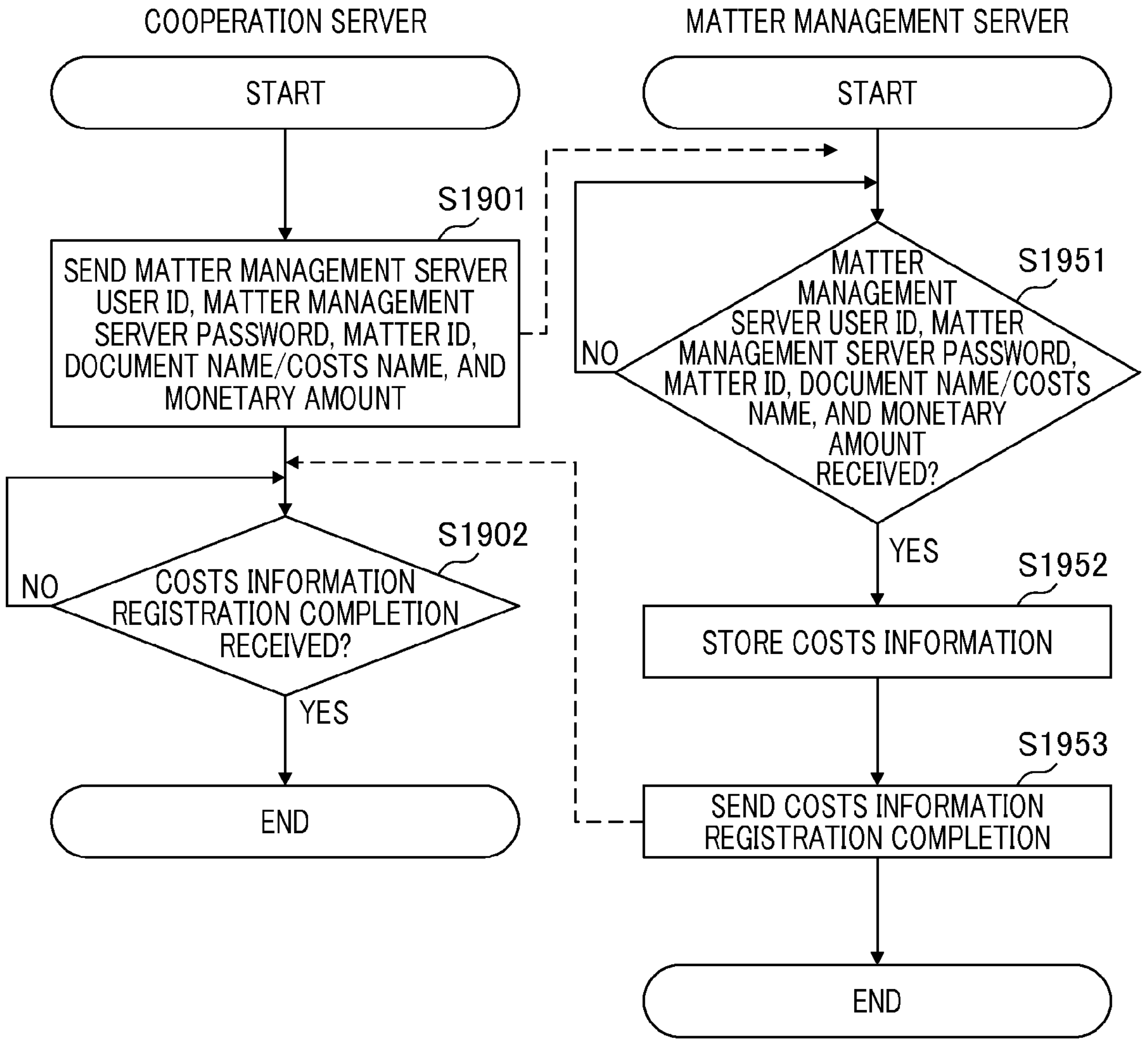
FIG. 20 illustrates a flowchart of the costs information registering order process.

The cooperation server 104 executes the processing illustrated in FIG. 20 and thereby registers on the matter management server 103 those costs that correspond to the costs registering information that includes the printing costs information and the other costs information set in response to an operation on the costs registering screen. In S1901, the information control unit 524 sends the matter management server user ID 643 and the matter management server user password 644 corresponding to a user that requests registering of costs registering information from the network control unit 525 to the matter management server 103. The matter management server user ID and the matter management server user password are based on the matter management server user information 640 linked in S1636 by the document printing management process illustrated in FIG. 17. Then the cooperation server 104 sends the matter ID 651, the document name 656 and the monetary amount 655 of the matter included in cooperation information 650 and being the object of the costs information that includes the to the matter management server 103. Then the cooperation server 104 sends the monetary amount and the matter name included in the other costs information. That is to say, in S1901, on the matter management server 103 side in S1951, the information control unit 516 determines whether or not the sent information has been received. At the same time, the matter management server 103 determines whether or not the matter ID, document name and monetary amount of the sent cooperation information, and the matter name and the monetary amount of the other costs information has been received. In S1902, the information control unit 524 determines whether or not the costs information registering completion notification has been received from the matter management server 103 through the network control unit 535. When the information control unit 524 determines that the notification has not been received, the processing proceeds again to S1902, and when it is determined that the notification has been received, the processing is ended. As described above, since the cooperation server 104 sends the matter ID, document name and monetary amount of the cooperation information, and the matter name and the monetary amount of the other costs information to the matter management server 103, the costs corresponding to the costs registering information can be linked with the matter information and registered in the matter management server 103.

The matter management server 103 executes the processing illustrated in FIG. 20. In S1951, the information control unit 516 determines whether or not the costs information has been received through the network control unit 517 from the cooperation server 104. The costs information in this context is the matter management server user ID 643, the matter management server password 644, the matter ID 651, the document name 656, the monetary amount 655, and the matter name and monetary amount of the other costs information. When the information control unit 524 determines that the costs information has not been received, the processing proceeds again to S1951, and when it is determined that the information has been received, the processing proceeds to S1952.

In S1952, the information control unit 516 sends the matter management server user ID 643 and the matter management server password 644 received from the cooperation server 104 in the step in S1951 to the user management unit 513, and orders verification thereof. The user management unit 513 reads the managed matter management server user password 603 of the managed matter management server user information 600 in which the received matter management server user ID 643 is managed as a matter management server user ID 601. Then the user management unit 513 verifies that the received matter management server password 644 corresponds to the matter management server password 644 in management server user information 600, and sends the verification result to the information control unit 516.

The information control unit 516 sends the matter ID 651, the document name 656, the monetary amount 655, the matter name 652, and the other costs information received in S1951 to the costs management unit 512. The information control unit 516 orders the costs management unit 512 to link the costs information in which the matter ID 651 is managed as a matter ID 621 and to store them. In relation to one received document name 656 or matter name 652, the costs management unit 512 links one item of costs information 620 with the matter ID 621 and stores them. Then the costs management unit 512 sends the storage result to the information control unit 516. In S1953, the cooperation server 104 is notified of the costs information registering completion. That is to say, in S1953, on the cooperation server 104 in S1902, it is determined whether or not the costs information registering completion notification has been received. Then the processing is ended.

(Matter Information Reference Processing)

The matter information reference processing of the client PC 102 and the matter management server 103 according to the present embodiment will be described making reference to the flowchart illustrated in FIG. 21. The respective programs of the client PC 102 and the matter management server 103 according to the present flow of operations are stored in the ROM 203, or in an external memory connected to the external memory I/F 204, and are read by the RAM 202 and executed by the CPU 201.

Figure 21:
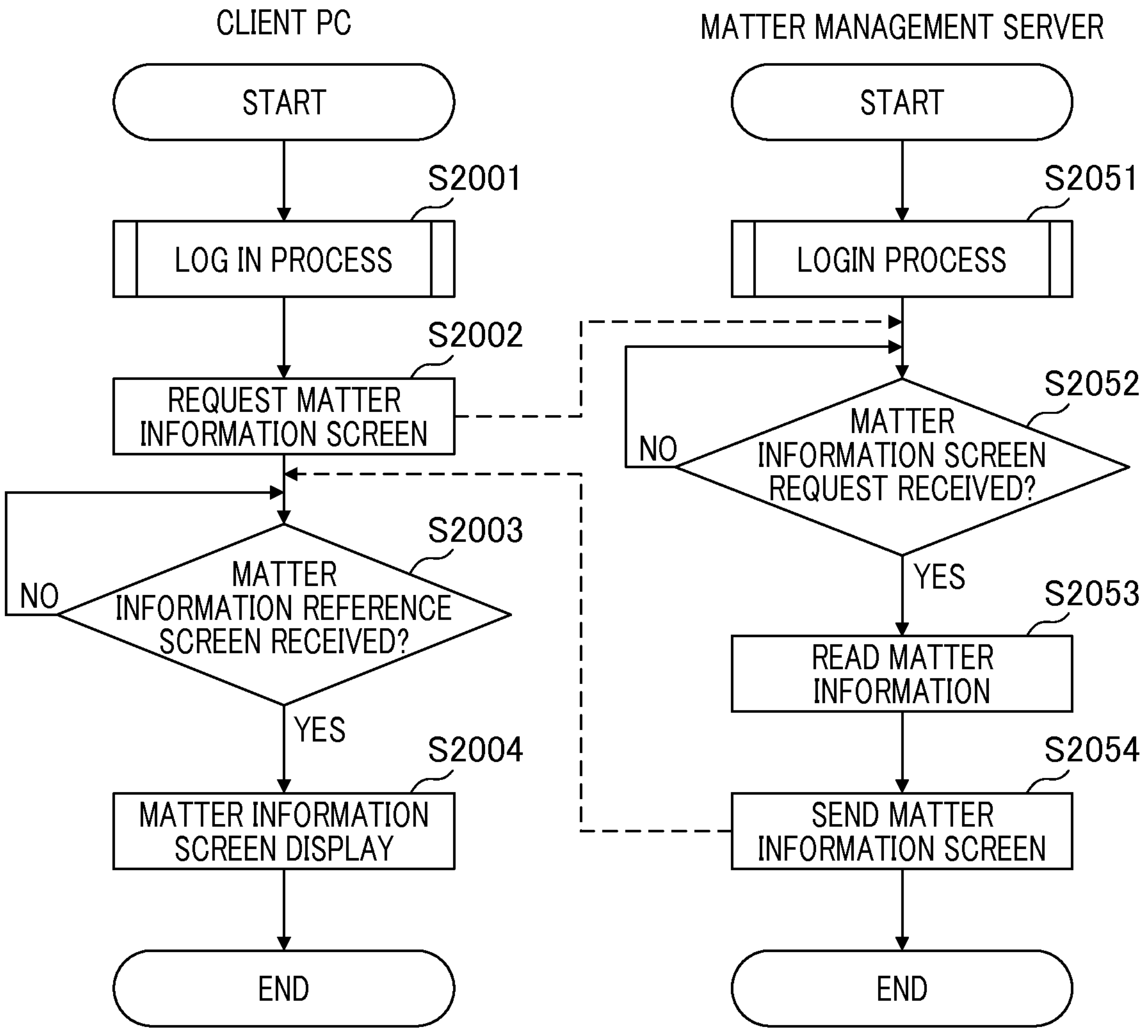
FIG. 21 illustrates a flowchart of the matter information reference process.

In the client PC 102, as illustrated in FIG. 21, the information control unit 502 in S2001 executes the matter management server login process illustrated in FIG. 15. Then the processing proceeds to S2002. In S2002, the information control unit 502 requests the matter management server 103 the matter information screen 1300 through the network control unit 503. That is to say, in S2002, on the matter management server 103 side in S2052, it is determined whether or not the matter information screen request has been received. Then the processing proceeds to S2003. In S2003, the information control unit 502 determines whether or not the matter information screen 1300 as illustrated in FIG. 14 has been received. When the information control unit 502 determines that the request for the matter information screen 1300 has not been received, the processing proceeds again to S2003, and when it is determined that the screen has been received, the processing proceeds to S2004. In S2004, the information control unit 502 orders the operation control unit 501 to display the matter information screen 1300, and when the operation control unit 501 displays the screen, the processing is ended.

In the matter management server 103, as illustrated in FIG. 21, in S2051, the information control unit 516 executes the matter management server login processing illustrated in FIG. 15. In S2052, the information control unit 516 determines whether or not the request for the matter information screen 1300 has been received through the network control unit 517 from the client PC 102. When the information control unit 516 determines that the request for the matter information screen 1300 has not been received, the processing proceeds again to S2052, and when it is determined that the request has been received, the processing proceeds to S2053. In S2053, the information control unit 516 acquires the matter management server user ID 601 from the matter management server user information 600 for the currently logged-in user that was received from the user management unit 513 in S1454 during the matter management server login processing illustrated in FIG. 15. Then the information control unit 516 sends the acquired matter management server user ID 601 to the matter management unit 511 and orders reading of the matter information 610 in which the matter management user ID 601 corresponds to the responsible party user ID 613. The matter management unit 511 acquires the matter information 610 in which the matter management user ID 601 corresponds to the responsible party user ID 613, and sends the same to the information control unit 516.

The information control unit 516 sends the received matter information 610 to the matter management unit 512, and orders acquisition of the costs information 620 in which the matter ID 611 of the matter information 610 corresponds to the matter ID 621 of the costs information 620. The costs management unit 512 acquires the costs information 620 that is linked with the received matter ID 621, and sends the same to the information control unit 516. In S2054, the information control unit 516 prepares a costs information screen 1300 based on the costs information 620 and the matter information 610 received in S2053, and sends the screen to the client PC 102. That is to say, in S2054, on the client PC 102 side in S2003, the information control unit 502 determines whether or not the matter information screen has been received. Then the processing is ended.

When the document related to the matter is printed, the matter management server, the cooperation server and the printing server execute processing in accordance with the flowchart that is described with reference to FIG. 16 and FIG. 17. In this manner, a document file that is stored and linked with a matter in the matter management server can be printed by order from the cooperation server to the printing server. In accordance with the sequence described above, an effect is obtained that troublesome operations as previously in which a user must firstly download a document file from the matter management server to a PC or the like, and then send the file from the PC to the printing service system are reduced.

When the costs information related to the matter is registered, the matter management server, the cooperation server and the printing server execute processing in accordance with the flowchart that is described with reference to FIG. 19 and FIG. 20. In this manner, costs information such as the monetary amount for printing by linkage to the matter, and other personnel costs or the like can be easily registered from a mobile terminal to the matter management server. In accordance with the sequence described above, an effect is obtained that troublesome operations as previously in which a user must refer to a receipt or the like from a PC to the matter management server so as to manually register printing costs together with personnel costs associated with the operation on the matter management server. Therefore, according to the information processing device of the present invention, printing can be executed on an image forming device without downloading data related to the matter onto a user device from a matter management device, and therefore costs produced in relation to printing by a user can be registered on the matter management device with a simple operation.

The registering process for the costs information on the matter management server in FIG. 20 that is performed in the cooperation server is executed on the mobile terminal, and an effect that is the same as the above is obtained even in relation to a configuration in which costs information is registered directly from the mobile terminal onto the matter management server by use of the costs information registering instruction process illustrated in FIG. 19.

In FIG. 17, although the copy number is not specified in relation to the printing order process from the cooperation server to the printing server, it goes without saying that a printing order process for a plurality of copies is enabled by specifying the number of copies in the printing order process from the cooperation server onto the printing server. Furthermore, when executing printing order processing of a plurality of copies, the same effect can be obtained by a configuration in which the printing order process for one copy is repeated on a plurality of occasions. Furthermore, in relation to the printing order for a plurality of copies, the settings may be switched in relation to respective users by executing one printing order process by specifying a copy number for the printing order process from the cooperation server to the printing server, or by performing the printing order process on a plurality of occasions.

In FIG. 17, when a plurality of printing IDs 671 is acquired and the printing order process is executed on a plurality of occasions from the cooperation server to the printing server, the plurality of printing IDs 671 are stated in the document printing order notification email. The same effect can be obtained even by a configuration in which a plurality of printing IDs 671 on the cooperation server are managed by a single linking ID, and the single linking ID is stated in the document printing order notification email. Furthermore, the settings may be switched in relation to respective users by maintaining the settings for each user by use of a plurality of printing IDs 671 or by use of a single linking ID.

Second Embodiment

In the first embodiment, as shown in the flowchart in FIG. 19, an order is made from the cooperation server 104 to the printing server 105 to read the printing information 670 when acquiring the printing monetary amount. However, it may be assumed that depending on configuration of the printing service system, a printing monetary amount 670 cannot be acquired from the printing server 105, and the printing monetary amount 672 may only be acquired from a receipt outputted from the MFP 107. In this situation, the registering of costs information 620 for the printing monetary amount 672 onto the matter management server 103 must be performed manually by a user while looking at a receipt on the client PC 102. Furthermore, in relation to the registering of other costs information as illustrated in FIG. 19, the personnel costs in relation to the travelling from the law firm offices or the like to the MFP 107 has to be registered by ascertaining the distance by use of a map or a Manpokei (Registered Trademark) (pedometer) by a user.

In the second embodiment, even when the printing monetary amount can only be acquired from a receipt outputted from the MFP 107, a matter management system will be described in which troublesome operations can be reduced in relation to the registering of costs information for printing monetary amount, or troublesome operations can be reduced in relation to registering the personnel costs for such travelling as other costs information. Although there is no particular limitation in this regard, the processing operations or the block diagrams in the present embodiment that have the same number as the first embodiment denote the same processing operations or block diagrams as the same numbers in the first embodiment.

(Costs Information Registering Screen 2100)

Figure 22:
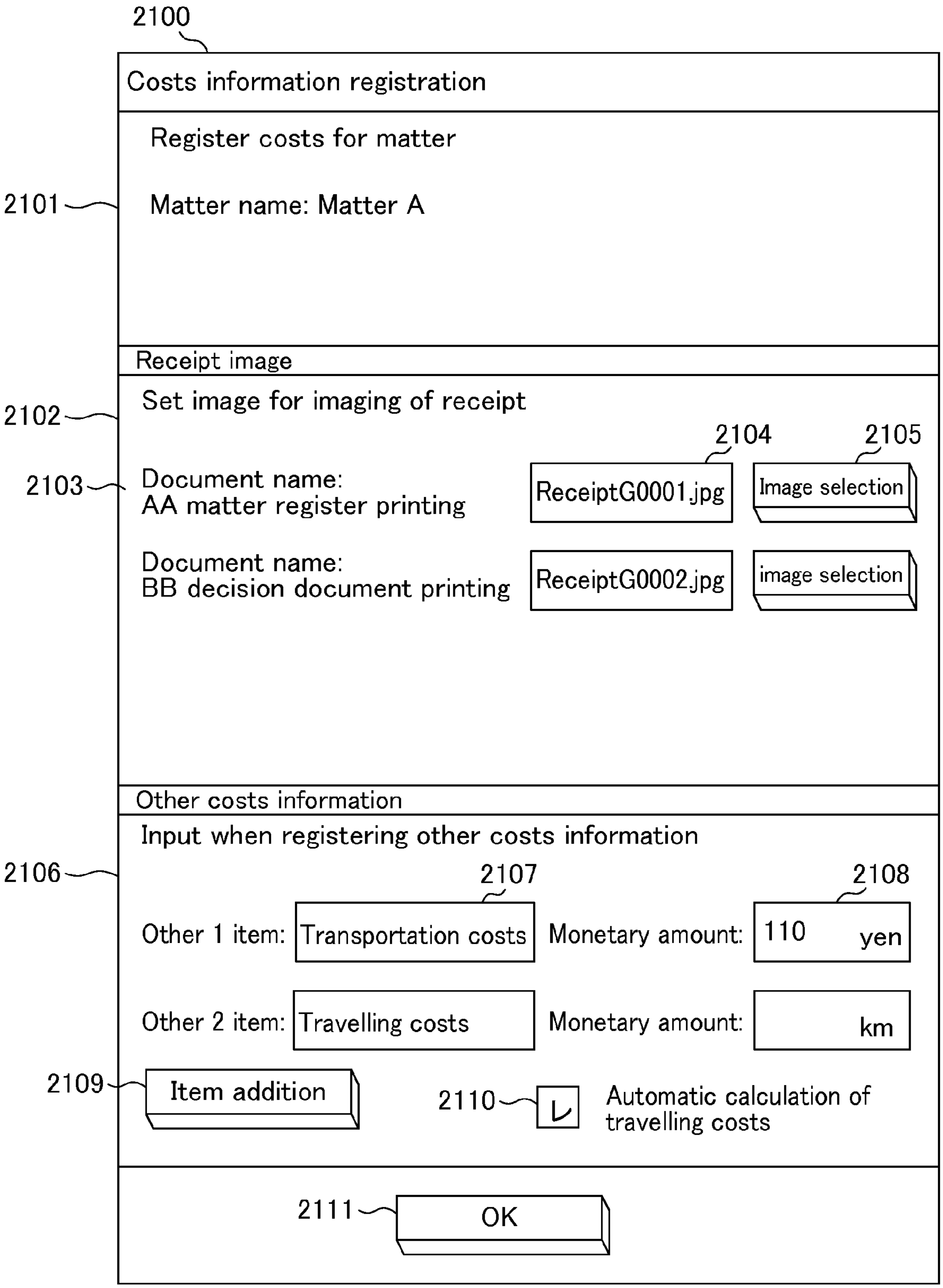
FIG. 22 illustrates an example of a costs information registering screen displayed in the display.

FIG. 22 illustrates an example of a costs information registering screen displayed on a display or the like connected to a display unit I/F 307 of the mobile terminal 106 in substitution for FIG. 13. The costs information registering screen 2100 includes a matter information display 2101, a receipt image display 2102, a document name 2103, a receipt image file input box 2104, and an image selection button 2105, or the like. The costs information registering screen 2100 includes an other costs information display 2106, an other costs information item input box 2107, an other costs information monetary amount input box 2108, an other costs information item addition button 2109, a travelling costs automatic calculation check box 2110, or the like. Furthermore, the costs information registering screen 2100 includes an OK button 2111, or the like.

The matter information display 2101 displays matter information 610 received by the information control unit 546 from the cooperation server 104. The receipt image display 2102 is a display for input by a user of a captured image of the receipt. The receipt image file input box 2104 is an input box for designating the image file name which the receipt outputted from the MFP 107 when the user prints the document has been captured. That is to say, the receipt image file input box 2104 functions as an image setting item for setting an image of a receipt that is read by the imaging unit of the mobile terminal 106. The operation control unit 541 detects receipt image file input box input by a user through the pointing device or hardware keys that are connected to the input/output I/F 305 or the display that is connected to the display unit I/F 307, and sends the same to the information control unit 546. The image selection button 2105 is a button for displaying the receipt image selection screen 2200 for selection by a user of a receipt image from the external memory of the mobile terminal 106. When the user presses the image selection button 2105, the operation control unit 541 displays the receipt image selection screen 2200 stating the file name of the image file in relation to which the user has made an image selection. Although the receipt image display 2102 in FIG. 22 only displays two receipt image file input boxes 2104, the display number is determined according to the number of items of printing information.

The other costs information display 2106 displays an input box for registering, by use of the mobile terminal 106 by a user, transportation costs or personnel costs for example other than the printing monetary amount to the matter server 103 through the cooperation server 104. The other costs information item input box 2107 is an input box for inputting an item of costs produced in addition to the printing monetary amount by use of the mobile terminal 106 by a user. The other costs information monetary amount input box 2108 is an input box for inputting a monetary amount in relation to the costs information item input box 2107 through use of the mobile terminal 106 by a user. The other costs information item addition button 2109 is a button to be pressed when adding an input matter number into the costs information item input box 2107 and the other costs information monetary amount input box 2108 through use of the mobile terminal 106 by the user. When the user presses the other costs information item addition button 2109, the operation control unit 541 displays added one costs information item input box 2107 and one the other costs information monetary amount input box 2108.

The travelling costs automatic calculation check box 2110 is a check box which a user selects that the mobile terminal 106 automatically calculates the travelling costs that are personnel costs related to travelling of a user who retrieves the printed materials at the MFP 107. That is to say, the travelling costs automatic calculation check box 2110 functions as a calculation instruction item for the travelling costs required to retrieve the printing output result of the MFP 107 by a user of the user device. The OK button 2111 is a button that is pressed when a user makes a register through the cooperation server 104 onto the matter management server 103 of the other costs information displayed on the other costs information display 2106 and the receipt image file that is displayed on the receipt image display 2103. Then the user presses the OK button 2111, the operation control unit 541 detects the content input on the costs information registering screen 2100 and sends the detected content to the information control unit 546. That is to say, the operation control unit 541 sends the selected receipt image, the other costs information or the value of the travelling costs automatic calculation check box 2110 to the information control unit 546. The information input by a user sent to the cooperation server 104 and registered through the cooperation server 104 onto the matter management server 103.

(Receipt Image Selection Screen 2200, Receipt Imaging Screen 2250)

Figure 23A:
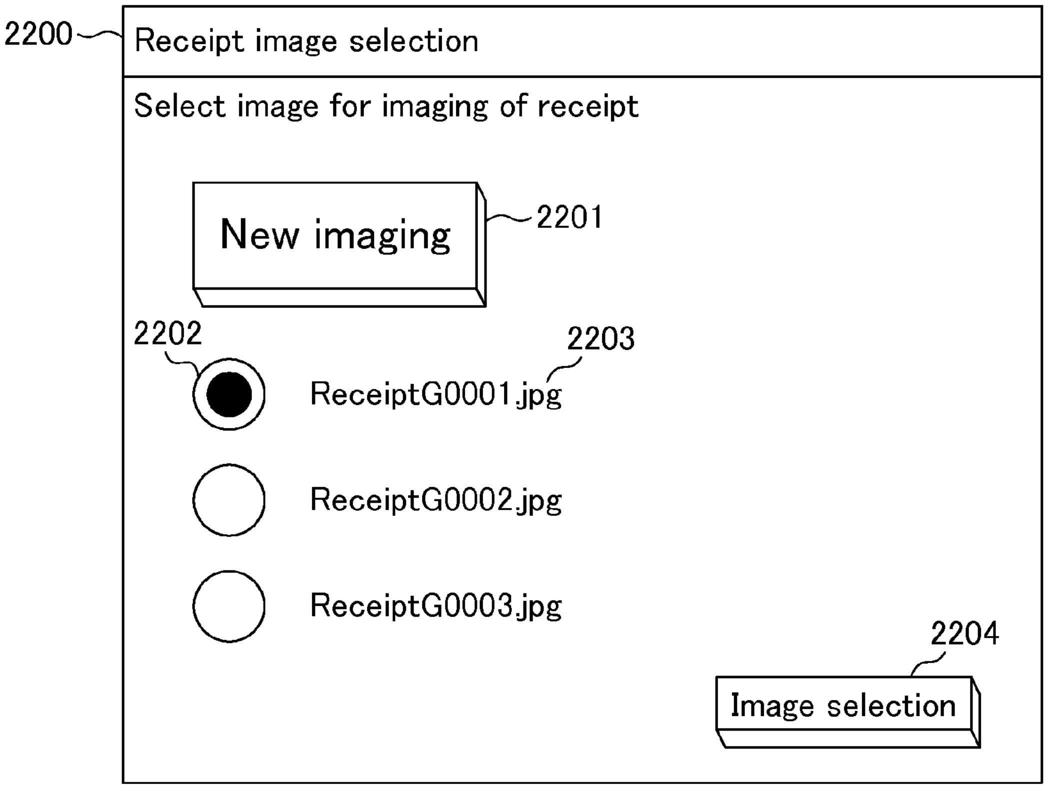
FIG. 23A illustrates an example of a receipt image selection screen.
Figure 23B:
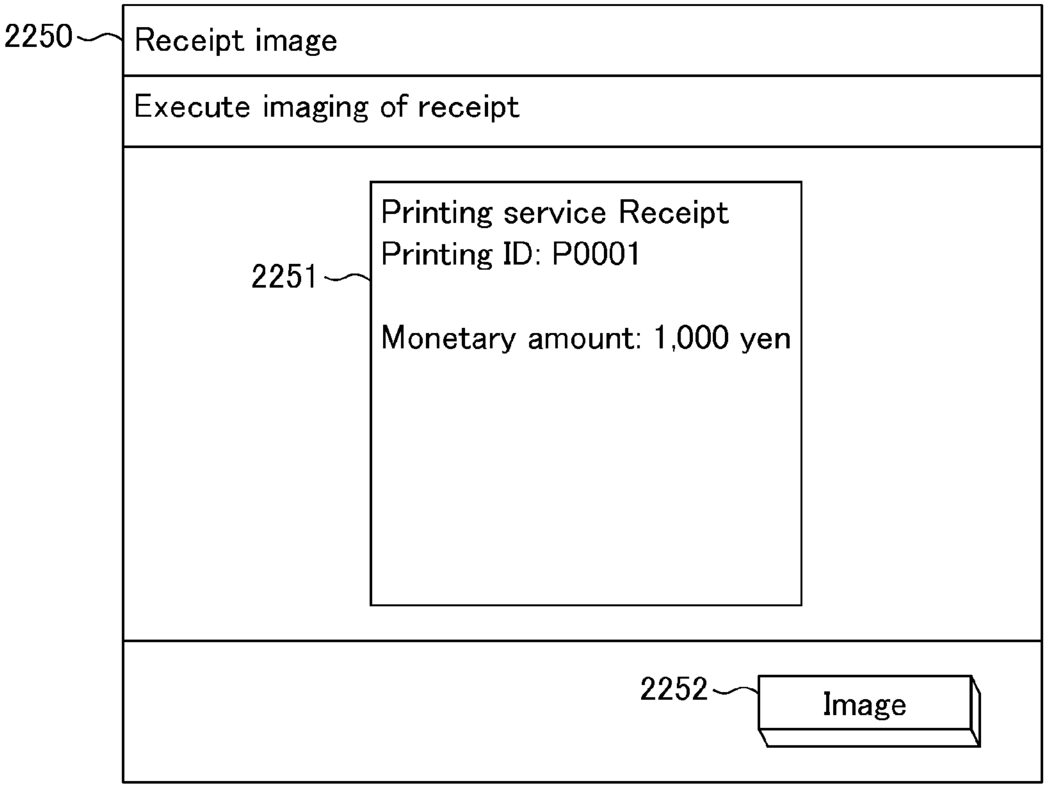
FIG. 23B illustrates an example of an image capture screen.

FIG. 23A and FIG. 23B illustrate an example of a receipt image selection screen and a receipt imaging screen displayed on a display of the mobile terminal 106. The receipt image selection screen 2200 includes a new imaging button 2201, an image file selection radio button 2202, an image file name display 2203, an image selection button 2204, or the like. The new imaging button 2201 is a button that is pressed when a user does not store an image of the receipt in the mobile terminal 106, and the receipt image screen 2250 is displayed to capture a new image of the receipt. When the user presses the new imaging button 2201, the operation control unit 541 displays the receipt imaging screen 2250. The image file selection radio button 2202 is a radio button for selection of a receipt image captured through the imaging unit 308, or the like. The operation control unit 541 detects the value of the image file selection radio button 2202 selected by a user and sends the same to the information control unit 546.

The image file name display 2203 is the filename of the image file that is stored in the external memory of the mobile terminal 106. Although only three items are displayed in the image selection radio button 2202 and the image file name display 2203 in FIG. 23, an arbitrary number of display items may be determined according to the item number of image files. The image selection button 2204 is a button that is pressed when the user determines the receipt image file. When the user presses the image selection button 2204, the operation control unit 541 closes the receipt image selection screen 2200. Then the display returns to the display of the costs information registering screen 2100, that is a state in which the image file name that is selected on the receipt image selection radio button 2202 is inputted into the receipt image file input button 2104.

The receipt imaging screen 2250 includes an imaging display 2251, an imaging button 2252, or the like. The imaging display 2251 displays a screen that is imaged by the imaging unit 308 of the mobile terminal 106. The imaging button 2252 is a button pressed when the user captures an image of the receipt image. When the user presses the imaging button 2252, the information control unit 546 acquires the image captured by the imaging unit 308 and stores the image as a file in the external memory. Furthermore, when the imaging is completed, the operation control unit 541 closes the receipt imaging screen 2250. Furthermore, the receipt image file name display returns to the display of the receipt image selection screen 2200, that is, a state in which the image file that is captured and stored is displayed.

(Costs Information Registering Instruction Process)

The costs information registering instruction processing of the mobile terminal 106, the cooperation server 104 and the printing server 105 in the present embodiment will be described making reference to the flowchart in FIG. 24. The respective programs of the mobile terminal 106, the cooperation server 104 and the printing server 105 according to the present flow of operations are stored in the ROM 303, 203, or in an external memory connected to the external memory I/F 304, 204, and are read by the RAM 302, 202 and executed by the CPU 301, 201.

Figure 24:
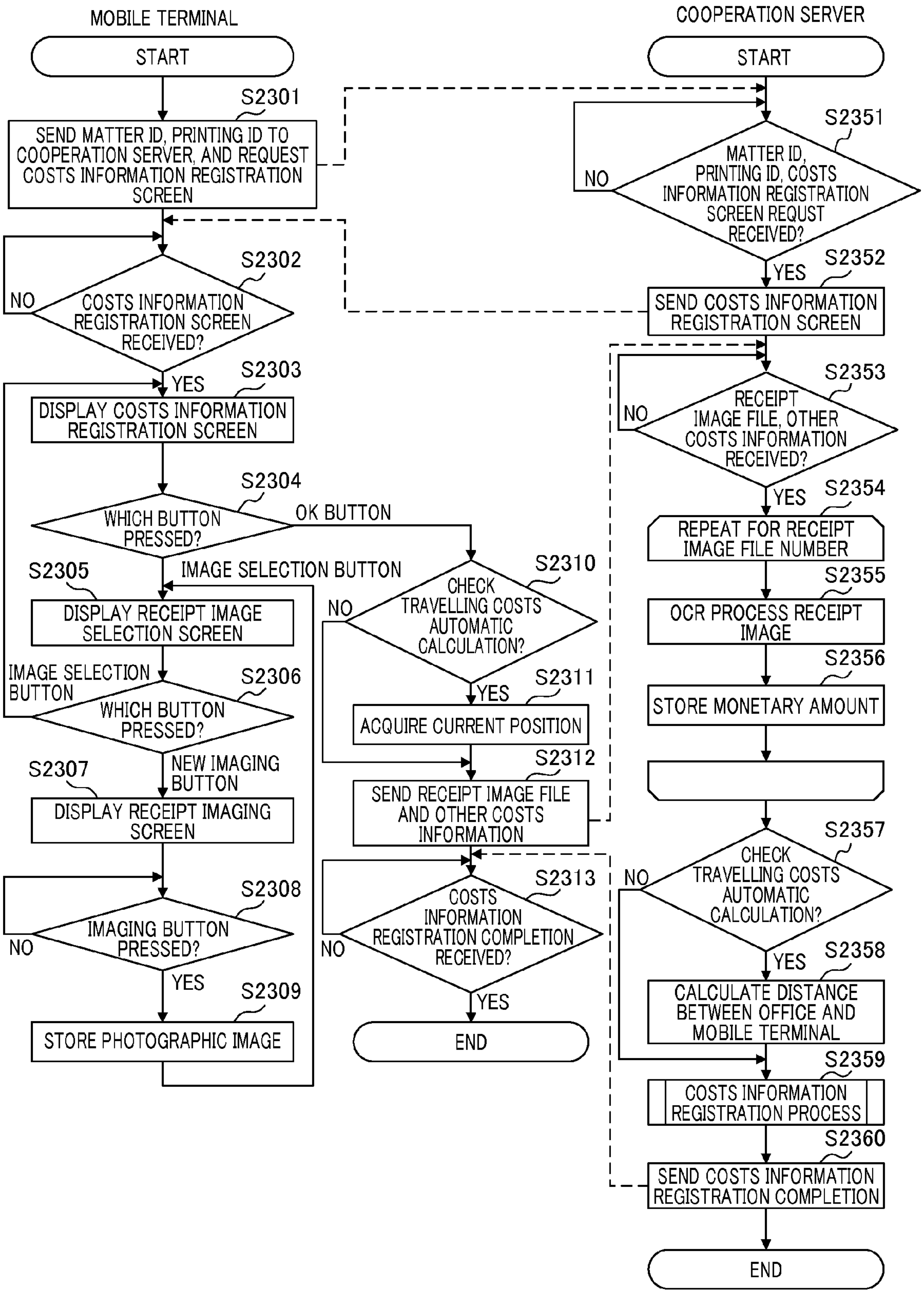
FIG. 24 illustrates a flowchart of the costs information registering instruction process.

The processing operations illustrated in FIG. 24 are executed in the mobile terminal 106. In S2301, when the operation control unit 541 detects pressing by a user of the costs registering screen URL 904 of the printing order notification email 900, the costs registering screen URL 904 is sent to the information control unit 546. The information control unit 546 accesses the cooperation server 104 that is shown in the address of the received costs registering screen URL 904. That is to say, the matter ID 651 and the printing ID 654 that are stated on the costs registering screen URL 904 are sent to the cooperation server 104. The information control unit 546 requests the costs information registering screen 2100 illustrated in FIG. 22 from the cooperation server 104. That is to say, in S2301, on the cooperation server 104 side in S2351, the information control unit 524 determines whether or not the sent information has been received.

In S2302, the information control unit 546 determines whether or not the costs information registering screen 2100 illustrated in FIG. 22 has been received. When the information control unit 546 determines that the costs information registering screen 2100 has not been received, the processing proceeds again to S2302, and when it is determined that the screen has been received, the processing proceeds to S2303. In S2303, the information control unit 546 orders the operation control unit 541 to display the costs information registering screen 2100, and the operation control unit 541 displays the screen. In S2304, the operation control unit 541 determines whether any of the image selection button 2105, the item addition button 2109, or the OK button 2111 on the costs information registering screen 2100 have been pressed by a user. When the operation control unit 541 determines that the image selection button 2105 has been pressed, the processing proceeds again to S2305, and when the operation control unit 541 determines that the OK button 2111 has been pressed, the processing proceeds to S2310.

In S2305, the information control unit 546 orders the operation control unit 541 to display the receipt image selection screen 2200, and the operation control unit 541 displays the screen. In S2306, the operation control unit 541 determines whether ether of the new imaging button 2201 or the image selection button 2204 of the receipt image selection screen 2200 have been pressed by a user. When the operation control unit 541 determines that the new imaging button 2201 has been pressed, the processing proceeds again to S2307, and when the operation control unit 541 determines that the image selection button 2204 has been pressed, the processing proceeds to S2303. That is to say, the display returns to the display of the costs information registering screen 2100, that is, a state in which the image file name selected on the receipt image selection radio button 2202 is inputted into the receipt image file input box 2104. In S2307, the information control unit 546 orders the operation control unit 541 to display the receipt imaging screen 2250. More particularly, the information control unit 546 orders the imaging control unit 542 to send the image captured by the imaging unit 308 to the operation control unit 541, and thereby the operation control unit displays the screen.

In S2308, the operation control unit 541 determines whether or not the imaging button 2252 of the receipt imaging screen 2250 has been pressed by a user. When the operation control unit 541 determines that the imaging button 2252 has been not pressed, the processing returns again to S2308, and when it is determined that the button has been pressed, the processing proceeds to S2309. In S2309, the information control unit 546 orders the imaging control unit 542 to acquire an image captured by the imaging unit 308, and the imaging control unit 542 sends the corresponding image to the information control unit 546. The information control unit 546 stores the received image as an image file in an external memory. Then the processing returns to S2305.

In S2310, the operation control unit 541 determines whether or not the travelling costs automatic calculation check box 2110 on the costs information registering screen 2100 has been checked by a user. When the operation control unit 541 determines that the travelling costs automatic calculation check box 2110 has not been checked, the processing proceeds to S2312, and when the check box has been checked, the processing proceeds to S2311. In the step in S2311, the information control unit 546 orders the position information management unit 544 to acquire position information such as the latitude 692 and the longitude 693 of the mobile terminal 106 acquired by the position acquisition unit 309. The position information acquired by the position acquisition unit 309 is sent by the position information management unit 544 to the information control unit 546. The information control unit 546 stores the position information as a type of other costs information in the external memory. Then the processing proceeds to S2312.

In S2312, the operation control unit 541 detects the content of the receipt image file and other costs information that have been inputted by a user on the costs information registering screen 2100, and sends the same to the information control unit 546. The information control unit 546 reads the receipt image file acquired from the operation control unit 541 out of the external memory, combines with the other costs information, and sends it from the network control unit 547 to the cooperation server 104. That is to say, in accordance with a setting operation to the travelling costs automatic calculation check box 2100, the mobile terminal 106 sends the position information of the mobile terminal 106 as costs information in addition to printing costs information to the information control unit 524 of the cooperation server 104. It is determined whether or not the sent information is received by the cooperation server 104 (S2352).

In S2313, the information control unit 546 determines whether or not the costs information registering completion notification has been received through the network control unit 547 from the cooperation server 104. When the information control unit 546 determines that the notification has not been received, the processing proceeds again to S2313, and when it is determined that the notification has been received, the processing is ended.

In the cooperation server 104, as illustrated in FIG. 24, in S2351, the information control unit 524 determines whether or not the matter ID 651, the printing ID 654 and the request for the costs information registering screen 2200 have been received through the network control unit 525 from the mobile terminal 106. When the information control unit 524 determines that matter ID 651, the printing ID 654 and the request for the costs information registering screen 2100 have not been received, the processing proceeds again to S2351, and when it is determined that the information has been received, the processing proceeds to S2352. In S2352, the information control unit 524 sends the costs information registering screen 2200 to the mobile terminal 106. That is to say, in S2352, on the mobile terminal 106 side in S2302, the information control unit 546 determines whether or not the costs information registering screen 2100 has been received. In S2353, the information control unit 524 determines whether or not the receipt image file or the other costs information has been received from the mobile terminal 106. When the information control unit 524 determines that the receipt image file or the other costs information have not been received, the processing proceeds again to S2353, and when it is determined that the information has been received, the processing proceeds to S2354.

In S2354, the information control unit 524 repeats the steps from S2355 to S2356 corresponding to the number of receipt image files received in S2353. In S2355, the information control unit 524 sends the receipt image file received in S2353 to the image processing unit 523, and orders the receipt image file to be subjected to OCR processing to thereby acquire a printing monetary amount. The image processing unit 523 subjects the receipt image file to OCR processing, acquires a printing monetary amount, and sends the printing monetary amount to the information control unit 524. In S2356, the information control unit 524 sends the printing monetary amount acquired in S2355 to the cooperation information management unit 521 and orders storage of the printing monetary amount. The cooperation information management unit 521 stores the received printing monetary amount as the monetary amount 655 of the cooperation information 650 that corresponds to the printing ID 654 received from the information control unit 541. The cooperation information management unit 521 sends the storage result to the information control unit 546.

In S2357, the information control unit 524 determines whether or not the travelling costs automatic calculation is set in the other costs information received in S2353. When the information control unit 524 determines that the travelling costs automatic calculation is set in the other costs information, the processing proceeds to S2358, and when it is determined that the travelling costs automatic calculation is not set, the processing proceeds to S2359. In S2358, the information control unit 546 accesses the matter management server 103, and requests position information for the reference point of the law firm offices or the like.

When the information control unit 516 of the matter management server 103 receives the position information request, the information control unit 516 orders the position information management unit 515 to read the position information 690 of the reference point. The position information management unit 515 reads the position information 690 of the reference point and sends the information to the information control unit 516. The information control unit 516 sends the received position information 690 of the reference point to the information control unit 524 of the cooperation server 104. The information control unit 524 of the cooperation server 104 acquires the position information 690 of the reference point. That is to say, the information control unit 524 acquires the position information of the mobile terminal 106 contained in the other costs information from the mobile terminal 106 in S2362 and acquires the reference position information 690 from the matter management server 104 in S2358. Then the information control unit 524 compares the position information 690 of the reference point acquired from the matter management server 103 in S2358 with the position information of the mobile terminal 106 contained in the other costs information acquired in S2353. Based on the comparison result, the information control unit 524 calculates the distance from the reference point to the mobile terminal 106. Then the information control unit 524 considers the calculated distance from the reference point to the mobile terminal 106 as travelling costs for other costs information, sends the information to the cooperation information management unit 521, and orders storage as a monetary amount for travelling costs. The cooperation information cooperation information management unit 521 considers the received distance from the reference point to the mobile terminal 106 as a monetary amount 655 for travelling costs, stores by linkage with a matter name, and sends the storage result to the information control unit 524.

In S2359, the information control unit 524 executes the costs information registering order processing illustrated in FIG. 20. The information control unit 524 sends the monetary amount 655 for travelling costs associated with a matter name to the matter management server (S1901). Then the processing proceeds to S2360. In S2360, the information control unit 524 notifies the mobile terminal 106 of the costs information registering completion through the network control unit 525. That is to say, in S2360, on the mobile terminal 106 side in S2313, the information control unit 546 determines whether or not the costs information registering completion has been received.

In the example of processing described with reference to FIG. 23, the information control unit 524 included in the cooperation server 104 acquires the printing costs information from the image that is sent from the mobile terminal in response to the setting operation on the receipt image file input box 2104 (S2312, S2355). Then the information control unit 524 registers the acquired printing costs information in the matter management server 103 (S2359).

When the printing costs are registered as costs information, the mobile terminal and the cooperation server execute processing in accordance with the flowchart in FIG. 24, and the user only uses the mobile terminal to image a receipt output from the MFP 107 upon printing, the cooperation server calculates the printing monetary amount from the receipt images. The above sequence of operations enables an effect that personnel costs that are related to travelling for the printing that have been typically calculated by a user from a map or a Manpokei (Registered Trademark) (pedometer) is readily registered. Also, troublesome operations such as the registering of a printing monetary amount as costs information are reduced even when the printing monetary amount can only be acquired from a receipt outputted from the MFP.

If personnel costs are registered in relation to travelling when printing a document of a matter, when the mobile terminal and the cooperation server execute processing in accordance with the flowchart in FIG. 24, the cooperation server calculates the distance from the position information of a reference point such as law firm offices and position information of a mobile terminal and registers the distance in the matter management server. The sequence of operations enables an effect of reducing the troublesome operations associated with the registering costs information as personnel costs related to travelling for printing that have been typically calculated by a user from a map or a Manpokei (Registered Trademark) (pedometer).

In the above embodiment, although the position information for the reference point is acquired by the mobile terminal from the matter management server, the position information for the reference point may be acquired from the cooperation server or may be prerecorded in the mobile terminal 106. Naturally, the function of calculating the distance from the reference point to the mobile terminal may be provided in the matter management server or the mobile terminal in addition to the cooperation server.

In the first embodiment, a costs information registering instruction process is described when a plurality of printing IDs is acquired by execution of the printing order process on a plurality of occasions from the cooperation server to the printing server and a plurality of printing IDs is stated in the document printing order notification email. Even in a configuration in which management is performed by use of one linking ID for the plurality of printing IDs on the cooperation server and the statement of one linking ID in the document printing order notification email, the same effect can be obtained by acquisition of the printing IDs for a plurality of documents and the associated printing monetary amounts from a single receipt image. Furthermore, the settings may be switched in relation to respective users by maintaining the settings either by use of a plurality of printing IDs or by use of one linking ID for each user.

Aspects of the present invention can also be realized by a computer of a system or device (or devices such as a CPU or MPU) that reads out and executes a program recorded on a memory device to perform the functions of the above-described embodiments, and by a method, the steps of which are performed by a computer of a system or device by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-055858 filed Mar. 13, 2012, which is hereby incorporated by reference herein in its entirety.

What is claimed is:

1. An information processing device that enables communication between a matter management device that manages data for each matter upon receipt of an order from a user device, an image forming device, and a printing service device, the information processing device comprising:

an acquiring unit configured to acquire document data and matter information linked to the document data that are sent from the matter management device that has received a printing instruction through the user device, to send the document data or the printing data that is generated based on the document data to the printing service device, and to acquire printing identifying information, that identifies the sent data, from the printing service device;

a notifying unit configured to notify the user device of a printing notification including the acquired printing identification information and access information to register the printing costs related to the printing instruction after completion of printing;

an image providing unit configured to provide the user device with a costs registering screen that is used to register the printing costs related to the printing instruction due to the access based on the access information from the user device; and a registering unit configured to receive the costs registering information from the user device that performs registering processing on the costs registering screen and to register the costs corresponding to the costs registering information by linkage with the matter information on the matter management device.

2. An information processing system comprising:

a matter management device that manages data for each matter upon receipt of an order from a user device;

a printing service device that enables communication with an image forming device; and an information processing device that enables communication through a network with the matter management device and the printing service device;

wherein the matter management device comprises:

a sending unit configured to receive a printing instruction for a document related to a matter from the user device, and send the printing instruction, document data and matter information linked to the document data to the information processing device; and a receiving unit configured to receive costs registering information for printing related to the printing instruction from the information processing device, wherein the information processing device comprises:

an acquiring unit configured to acquire document data and matter information that is linked to the document data that are sent from the matter management device, to send the document data or the printing data that is generated based on the document data to the printing service device, and to acquire printing identifying information, that identifies the sent data, from the printing service device;

a notifying unit configured to notify the user device of a printing notification including the acquired printing identification information and access information to register the printing costs related to the printing instruction after completion of printing;

an image providing unit configured to provide the user device with a costs registering screen that is used to register the printing costs related to the printing instruction due to the access based on the access information from the user device; and a registering unit configured to receive the costs registering information from the user device that performs registering processing on the costs registering screen and to register the costs corresponding to the costs registering information by linkage with the matter information on the matter management device, wherein the printing service device comprises:

a generating unit configured to generate printing identification information to identify the data for causing the image forming device to print when the data and the printing instruction are received from the information processing device.

3. The information processing system according to claim 2, wherein, the information processing device further comprises a management unit configured to link the matter identification information contained in the matter information received from the matter management device, the printing identification information acquired from the printing service device, the document information related to the printed data, and the printing costs information for the document, and to manage the linked information as management information, wherein the access information includes the matter identification information and the printing identification information, and wherein the image providing unit provides the costs registering screen to the user device, the costs registering screen including printing costs information and document information corresponding to the printing identification information and the matter identification information included in the access information that is accessed by the user device, of the document information and the printing costs information included in the management information managed by the management unit.

4. The information processing system according to claim 3, wherein the management unit acquires printing costs information from the printing service device, the printing costs information related to printing of the data corresponding to the printing identification information included in the access information accessed by the user device, and manages the management information that includes the acquired printing costs information.

5. The information processing system according to claim 2, wherein the user device comprises a reading unit configured to read a receipt as an image, the receipt stating printing costs information for the printed data that is output by the image forming device, wherein the image providing unit provided in the information processing device provides the costs registering screen to the user device, the costs registering screen including an image setting item that sets the image read by the reading unit of the user device, and wherein the registering unit provided in the information processing unit acquires the printing costs information from the image sent from the user device in response to the setting operation for the image setting item, and registers the acquired printing costs information by linkage with the matter information in the matter management device.

6. The information processing system according to claim 5, wherein the information processing device further comprises a management unit configured to link the matter identification information contained in the matter information received from the matter management device, the printing identification information acquired from the printing service device, and the document information related to the printed data, and to manage such information as management information, wherein the access information includes the matter identification information and the printing identification information, wherein the image providing unit provides the costs registering screen to the user device, the costs registering screen including document information corresponding to the printing identification information and the matter identification information included in the access information that is accessed by the user device, of the document information the printing costs information included in the management information managed by the management unit, and wherein the reading unit provided in the user device reads the receipt that states the printing costs information of a document selected from the documents corresponding to the document information included in the costs registration screen.

7. The information processing system according to claim 3, wherein, the image providing unit provides the costs registering screen to the user device, the costs registering screen including a setting item for costs information other than the printing costs information, and wherein the registering unit acquires costs registering information that includes the printing costs information and costs information other than the printing costs information set in response to an operation on the costs registering screen, and registers the costs corresponding to the acquired costs registering information on the matter management device.

8. The information processing system according to claim 7, wherein a setting item for costs information other than printing costs information included in the costs registering screen further includes a calculation instruction item for the travelling costs required to retrieve, by a user of the user device, the printing output result by the image forming device, wherein the user device sends position information for the user device to a registering unit provided in the information processing device as costs information other than printing costs information in response to a setting operation for the calculation instruction item for the travelling costs, and wherein the registering unit included in the information processing device acquires the position information for the user device from the user device, acquires the reference position information from the matter management device, and calculates the travelling costs based on the acquired position information of the user device and the reference position information and registers the calculated travelling costs in the matter management device.

9. A method for controlling an information processing device that enables communication between a matter management device, that manages data for each matter upon receipt of an order from a user device, an image forming device, and a printing service device, the method comprising:

acquiring document data and matter information linked to the document data that are sent from the matter management device that has received a printing instruction through the user device, sending the document data or the printing data that is generated based on the document data to the printing service device, and acquiring printing identifying information, that identifies the sent data, from the printing service device;

notifying the user device of a printing notification including the acquired printing identification information and access information to register the printing costs related to the printing instruction after completion of printing;

providing the user device with a costs registering screen that is used to register the printing costs related to the printing instruction due to the access based on the access information from the user device; and receiving the costs registering information from the user device that performs registering processing on the costs registering screen and registering the costs corresponding to the costs registering information by linkage with the matter information on the matter management device.

10. A non-transitory storage medium on which is stored a computer program for making a computer execute a method for controlling an information processing device that enables communication between a matter management device that manages data for each matter upon receipt of an order from a user device, an image forming device, and a printing service device, the method comprising:

acquiring document data and matter information linked to the document data that are sent from the matter management device that has received a printing instruction through the user device, sending the document data or the printing data that is generated based on the document data to the printing service device, and acquiring printing identifying information, that identifies the sent data, from the printing service device;

notifying the user device of a printing notification including the acquired printing identification information and access information configured to register the printing costs related to the printing instruction after completion of printing;

providing the user device with a costs registering screen that is used to register the printing costs related to the printing instruction due to the access based on the access information from the user device; and receiving the costs registering information from the user device that performs registering processing on the costs registering screen and registering the costs corresponding to the costs registering information by linkage with the matter information on the matter management device.

* * * * *